(12) United States Patent
Johnson

(10) Patent No.: US 9,106,571 B2
(45) Date of Patent: Aug. 11, 2015

(54) POWER DISTRIBUTION SYSTEM COMMUNICATION SYSTEM AND METHOD

(75) Inventor: Martin P. Johnson, Rio Linda, CA (US)

(73) Assignee: S&C Electric Company, Chicago, IL (US)

(*) Notice: Subject to any disclaimer, the term of this patent is extended or adjusted under 35 U.S.C. 154(b) by 0 days.

(21) Appl. No.: 13/180,280

(22) Filed: Jul. 11, 2011

(65) Prior Publication Data

US 2012/0320731 A1    Dec. 20, 2012

Related U.S. Application Data

(63) Continuation of application No. 11/899,765, filed on Sep. 7, 2007, now abandoned.

(60) Provisional application No. 60/844,782, filed on Sep. 15, 2006.

(51) Int. Cl.
| | | |
|---|---|---|
| H04L 12/715 | (2013.01) | |
| H04L 12/721 | (2013.01) | |
| H04L 12/751 | (2013.01) | |
| H04L 12/725 | (2013.01) | |
| H04W 40/20 | (2009.01) | |
| H04W 40/28 | (2009.01) | |
| H04W 40/32 | (2009.01) | |
| H04L 12/733 | (2013.01) | |
| H04L 29/08 | (2006.01) | |

(52) U.S. Cl.
CPC ............... *H04L 45/26* (2013.01); *H04L 45/02* (2013.01); *H04L 45/04* (2013.01); *H04L 45/126* (2013.01); *H04L 45/302* (2013.01); *H04L 45/32* (2013.01); *H04L 45/34* (2013.01); *H04L 67/12* (2013.01); *H04W 40/20* (2013.01); *H04W 40/28* (2013.01); *H04W 40/32* (2013.01)

(58) Field of Classification Search
CPC .................................. H04L 45/02; H04L 45/04
USPC ......... 370/216, 230, 254, 338, 351, 389, 390, 370/401, 410; 455/7, 435, 436, 446, 456.1, 455/562.1
See application file for complete search history.

(56) References Cited

U.S. PATENT DOCUMENTS

| | | | | |
|---|---|---|---|---|
| 5,278,890 | A * | 1/1994 | Beeson et al. | 340/7.24 |
| 6,104,712 | A * | 8/2000 | Robert et al. | 370/389 |
| 6,304,556 | B1 * | 10/2001 | Haas | 370/254 |
| 6,807,165 | B2 * | 10/2004 | Belcea | 370/347 |
| 6,870,846 | B2 * | 3/2005 | Cain | 370/392 |
| 6,977,938 | B2 * | 12/2005 | Alriksson et al. | 370/401 |
| 7,382,740 | B2 * | 6/2008 | Joshi | 370/254 |
| 7,403,988 | B1 * | 7/2008 | Blouin et al. | 709/223 |
| 7,609,641 | B2 * | 10/2009 | Strutt et al. | 370/238 |
| 2003/0186710 | A1 * | 10/2003 | Muhonen et al. | 455/456.5 |
| 2004/0264372 | A1 * | 12/2004 | Huang | 370/230 |
| 2005/0169238 | A1 * | 8/2005 | Yang et al. | 370/351 |

(Continued)

*Primary Examiner* — Andrew Lai
*Assistant Examiner* — Andrew C Lee

(57) ABSTRACT

A power distribution system may incorporate a network communication capability. The network communication capability may be configured or may be configurable as a multi-tiered, mesh network. The network may have two tiers of fixed node meshes (tier 2 and tier 3) and one tier of mobile nodes mesh (tier 1). Each tier and each node of each tier has distinct characteristics relative to application, type of routing, transmit power control, physical configuration and message priorities. The configuration and the characteristics of the network change based upon varying application and communication needs of the network.

20 Claims, 19 Drawing Sheets

(56) References Cited

U.S. PATENT DOCUMENTS

| | | | |
|---|---|---|---|
| 2006/0030333 A1* | 2/2006 | Ward et al. | 455/456.1 |
| 2006/0176872 A1* | 8/2006 | Serna et al. | 370/351 |
| 2007/0149204 A1* | 6/2007 | Redi et al. | 455/446 |
| 2008/0056121 A1* | 3/2008 | Tsai et al. | 370/216 |

\* cited by examiner

POWER DISTRIBUTION SYSTEM COMMUNICATION SYSTEM AND METHOD

CROSS-REFERENCE TO RELATED APPLICATIONS

This patent is a continuation of U.S. patent application Ser. No. 11/899,765 filed Sep. 7, 2001, which claims the benefit of U.S. Provisional Application No. 60/844,782 filed Sep. 15, 2006, the disclosures of which are hereby expressly incorporated herein by reference.

TECHNICAL FIELD

This patent relates to power distribution systems, and more particularly, this patent relates to communication systems and methods providing communication within power distribution systems.

BACKGROUND

Power distribution systems include technology to couple sources of power to loads while protecting the distribution infrastructure and maintaining service via circuit protection, fault isolation, circuit reconfiguration (typically for restoration of service to stranded, load-side customers) and system return-to-normal functions. For example, the power distribution system may include circuit switching and fault protection devices including: source protection devices, such as circuit breakers, load protection devices, such as fuses, and fault protection devices, such as fault interrupters, sectionalizers, reclosers and the like, that segment a distribution line and permit fault isolation. While various strategies may be employed to manage the power distribution system to maintain service and to protect the power distribution system, typically the fault protection devices should operate in a coordinated manner to optimize performance of the power distribution system and to minimize the scope and duration of service interruptions. That is, to isolate a fault at the fault protection device nearest the fault to protect the source and to preserve service to loads between the source and the fault protection device.

At the same time, the power distribution system should be manageable, recoverable and operable at a high level of performance with reduced burden. These goals become difficult to obtain as the distribution system becomes heavily populated with distributed, intelligent devices that allow an operator to manage and control the distribution of power and protect the distribution infrastructure.

Wide area communication systems have been employed for several decades as a means to enhance the automation of electric power distribution systems to provide management, improved operation and system recovery. These systems are responsible for controlling the distribution of power from sources/substations out over medium voltage feeders/distribution lines to consumers and are typically radio based due to the high cost of providing fiber or other fixed communication media over a wide geographic area. An example of commercial communication products include the Utilinet radio, sold by Schlumberger, Inc. Most of these products are used in conjunction with SCADA systems, or other low to medium-speed communication applications such as the IntelliTEAM® circuit reconfiguration system, available from S&C Electric Company, Chicago, Ill.

Many aspects of the management and control and particularly the fault protection of the power distribution system, on the other hand, require high speed (low latency) and high reliability communications. Such systems are again preferably radio-based to take advantage of the ease and low cost of installation. An example of such a system includes the HRDS system available from S&C Electric Company. These systems utilize dedicated point-to-point links and dedicated communication channels for each pair of communicating devices. A company called Freewave Communications offers a radio-based off-the-shelf product for use in conjunction with the Schweitzer Engineering Laboratories, Inc. (SEL) mirrored-bits communication protocol. With these two technologies, digital status points can be conveyed between two interconnected distribution automation control devices over radio-based communication infrastructure.

There remain various drawbacks to radio-based, dedicated point-to-point systems:

1) Each point-to-point link requires dedicated infrastructure including dedicated channels and often dedicated radio pairs and repeaters. This makes the cost prohibitive and the installation and maintenance process cumbersome.

2) In grid-style power distribution topologies, it may take many of these point-to-point links to provide comprehensive coordination of protective devices.

3) If the communication link fails, no other communication path can be created "on-the-fly" to restore the communication link.

4) The links cannot be used to exchange other communication traffic because this could compromise the low-latency message delivery requirements of protection applications.

Mesh-topology communication systems or communication systems based upon the Internet's Ad-Hoc Routing methodology and spread-spectrum radios address several of the foregoing concerns, but not all. Bandwidth and/or latency-related issues remain, particularly when the systems are allowed to carry other competing communication traffic. For example, mesh network architecture requires that most nodes in the network have at a minimum communication links to two different nodes to provide alternate routing. Wired networks, e.g., copper or fiber optic, contain communication energy within the communication links between the node and its neighbor nodes. Wireless networks, one the other hand, have traditionally employed broadcast capability, i.e., omni antenna, and the energy utilized to affect a communication is not contained. Nodes not intended to be part of the communication path receive this energy and are thus forced to delay their own transmissions until the spectrum is clear leading to inefficient bandwidth usage and potential latency issues.

What is needed is a communication system that can efficiently manage routine radio communication traffic and that responds quickly, effectively and reliably to prioritized or emergency communication traffic. Such a system may respond to more than one priority of message traffic, and may do so without losing or seriously disrupting lower priority traffic. The communication system may also recognize the presence of prioritized or emergency traffic and respond to that traffic in an effective manner. The communication system may also support complex interconnectivity and alternate communication paths to provide consistent, reliable high speed radio-based communication. The system should do so without requiring complex, time-consuming configuration.

DETAILED DESCRIPTION

A power distribution system may incorporate a network communication capability. The network communication capability may be configured or may be configurable as a multi-tiered, mesh network ("network"). For example, the network may have two tiers of fixed node meshes (tier 2 and tier 3) and one tier of mobile nodes mesh (tier 1), although alternate structures incorporating additional or fewer tiers. Each tier and the nodes of each tier have distinct characteristics relative to application, type of routing; transmit power control, physical configuration and message priorities. The configuration and the characteristics of the network change based upon varying application and communication needs of the network. Configuration changes may be implemented through spectrum management, power control and node awareness in the multi-tiered and multi-dimensional network.

Adopting a dynamically configurable network communication capability for the power distribution system provides a robust, self-healing network that can make available multiple permutations of network topography for virtually any given source or destination route. A meshed system for any given communication session is, in reality, a serial path between the source and destination that is connected via one or more nodes/routes in tandem acting as repeaters. A well designed mesh network allows multiple sessions to be simultaneously accommodated within the network at any given time.

Figure 1:
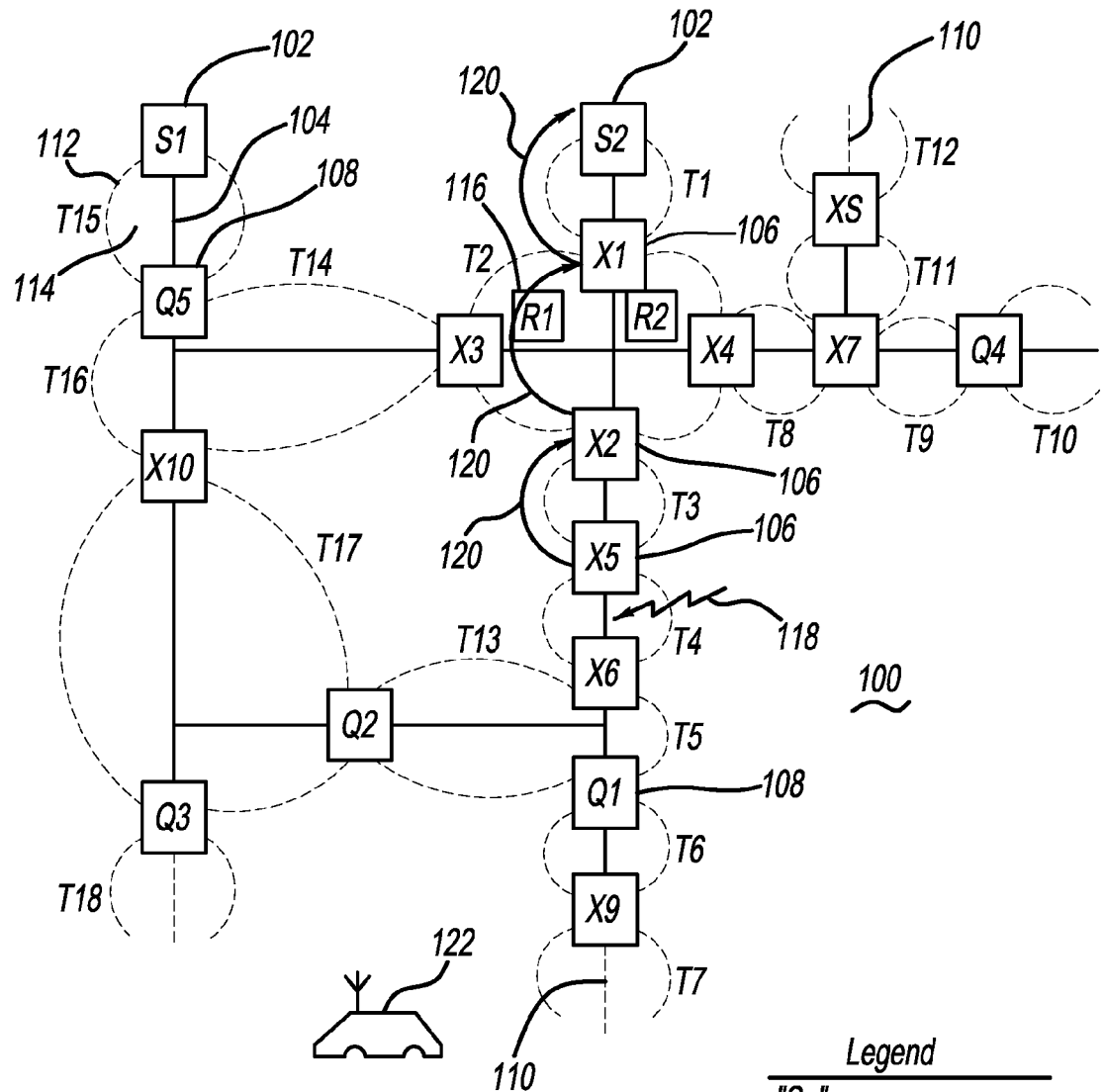
FIG. 1 is a graphic illustration of power distribution grid incorporating network communication architecture in accordance with the herein described embodiments.

FIG. 1 illustrates an example open loop or radial electrical distribution system 100 that may incorporate the communication architecture, systems and methods, i.e., a communication network, in accordance with one or more of the herein described embodiments. It should be understood that while various communication technology, techniques and methodologies will be described in connection with the various herein described embodiments of the communication network, the system components and structures, techniques and methodologies may well be interchangeable in various actual implementations. Thus, one of ordinary skill in the art will appreciate that while each element, structure, feature or technique may not be described in connection with every embodiment they are variously combinable in implementations not specifically described herein; however, such combination are contemplated within this disclosure. Furthermore, while the communication architecture, systems and methodologies are described primarily in connection with power distribution systems, these architectures, systems and methodologies may be employed with various other systems such as petroleum processing and distribution systems, emergency services and first responder communication systems and the like.

The electrical power distribution system 100 illustrates a typical electrical power distribution structure and how such a system operates. The system 100 may incorporate one or more substations or sources of supply (S1-$n$) 102 that provide electricity for distribution via the system 100. The solid straight lines 104 illustrate distribution lines or conductors that connect between the sources 102 and closed switches (X1-$n$) 106 and open switches (O1-$n$) 108. Each line 104 typically represents a three-phase distribution feeder, which may or may not contain a fourth ground conductor depending on the type of distribution. The dashed straight lines 110 indicate connections to adjacent feeders or adjacent substations (not depicted). The curved dashed lines 112 indicate portions (or segments) 114 of the distribution system 100 bounded by switches 106/108. This description of the distribution system 100 is consistent with the architecture of the IntelliTEAM-II circuit reconfiguration system where the switches 106/108 associated with each of these segments 114 is known collectively as a "team" (T1-$n$). The optionally provided repeaters/routers (R1-$n$) 116 represent repeating radios that may form a portion of a network as described in further detail below.

Figure 2:
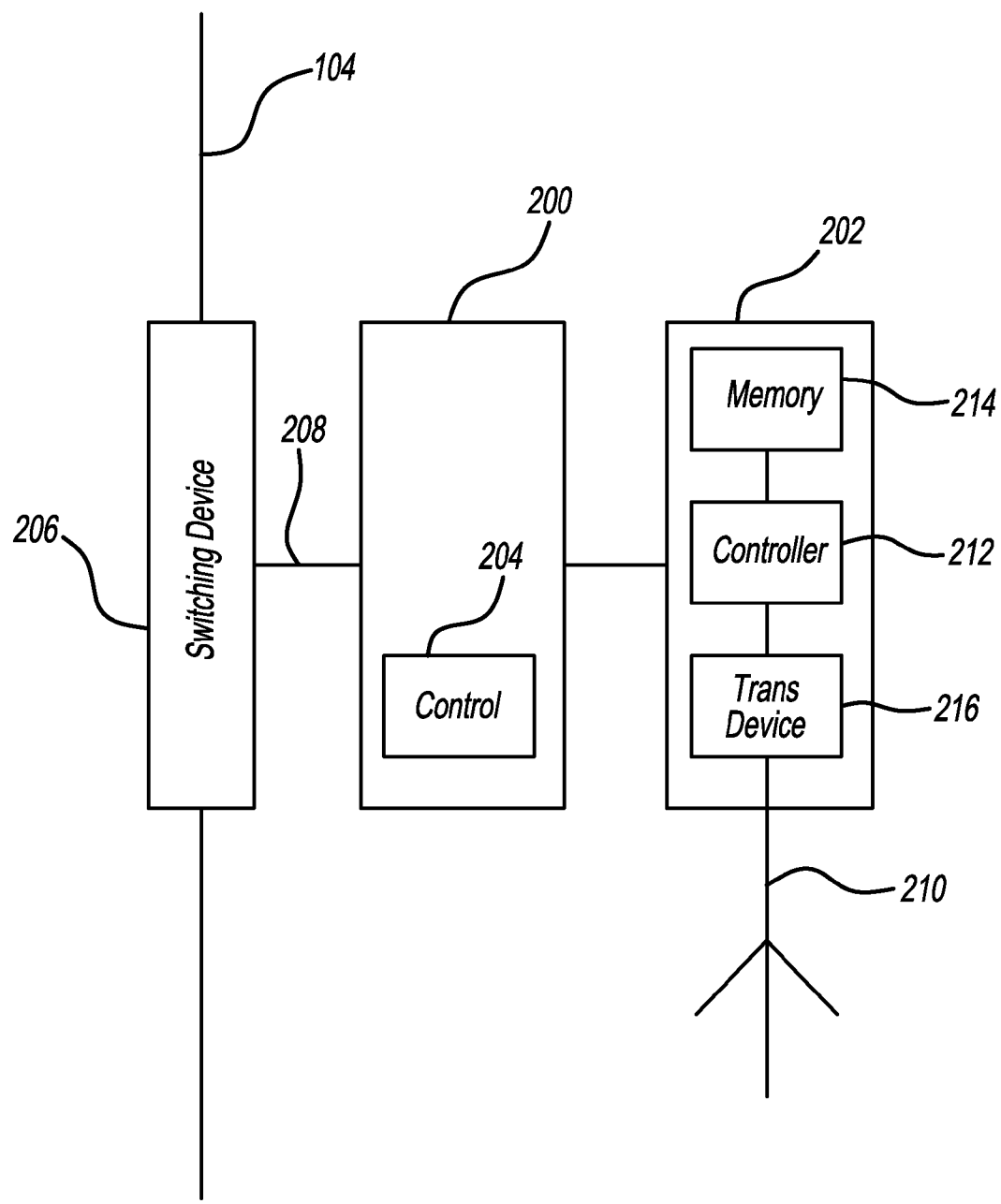
FIG. 2 is a block diagram of a distributed power distribution device including network architecture communication capability in accordance with the herein described embodiments.

FIG. 2 illustrates a typical switching or fault protection device, device 200 that may provide the function of the switches 106/108 of the system 100. The device 200 may include a control 204 that couples to a circuit interrupting or switching device 206, such as a circuit breaker, vacuum fault interrupter or the like. The control 204 may include internal memory or may couple to memory (not depicted) wherein is stored a control program and operating parameters used by the control 204 to affect operation of the device 200. The device 200 may further include a power supply, which may be provided by an external source, a storage source, a distribution line tap, or any other suitable power source, (not depicted).

The device 200 couples to an associated communication device 202 that operates in accordance with a communication architecture and communication protocol consistent with the herein described network embodiments. Alternatively, the communication device 202 may be incorporated within the device 200. One possible communication device 202 is a Nova Engineering Inc. NovaRoam EH900 frequency hopping spread spectrum radio. The communication device 202 may connect to the control 204 via a 10/100 MBS Ethernet connection 208, and seamlessly creates what appears to the control 204 to be an Internet Protocol (IP) wide area network. The communication device 202 may provide layers 1-3 of an OSI-compliant TCP/IP communication protocol stack, and may allow messages to be intelligently routed within the system 100 using the herein described routing protocols. In this regard, the communication device 202 may include a controller 212 coupled to a memory or cache 214. The memory may store electronically, optically or otherwise a control program used by the communication device to affect generation, transmission, receipt and/or routing of route configuration messages, data containing messages, system overhead messages, mapping and discovery messages, system maintenance messages, and the like. The controller 212 is further coupled to a transmitting device that couples to an antenna 210 to affect transmission of the various messages.

Each of the devices, e.g., sources/destinations 102, switches 106/108, loads (not depicted) and repeaters 116 within the system 100 form points or nodes of the communication network and as such incorporate a communication capability such as the communication device 202 described in connection with the device 200 or any other suitable communication capability. The communication system may incorporate stationary stand alone communication devices, e.g., repeaters 116, and may furthermore incorporate mobile communication devices, mobile units 122, such as communication devices, wireless enabled computing devices, handheld computing devices, cellular data-enabled communication devices and the like associated with mobile service personnel that may include a communication capability, memory and process capability in order to operate to affect generation, transmission, receipt and/or routing of route configuration messages, data containing messages, system overhead messages, mapping and discovery messages, system maintenance messages, and the like. Still further, communication devices that are not associated with the system may be incorporated into the network. These devices may include public or private wireless access points, wireless enabled computing devices, handheld computing devices, cellular data-enabled communication devices, and the like that may be made to communicate in a manner compatible with the herein described communicate network and protocol.

Figure 3:
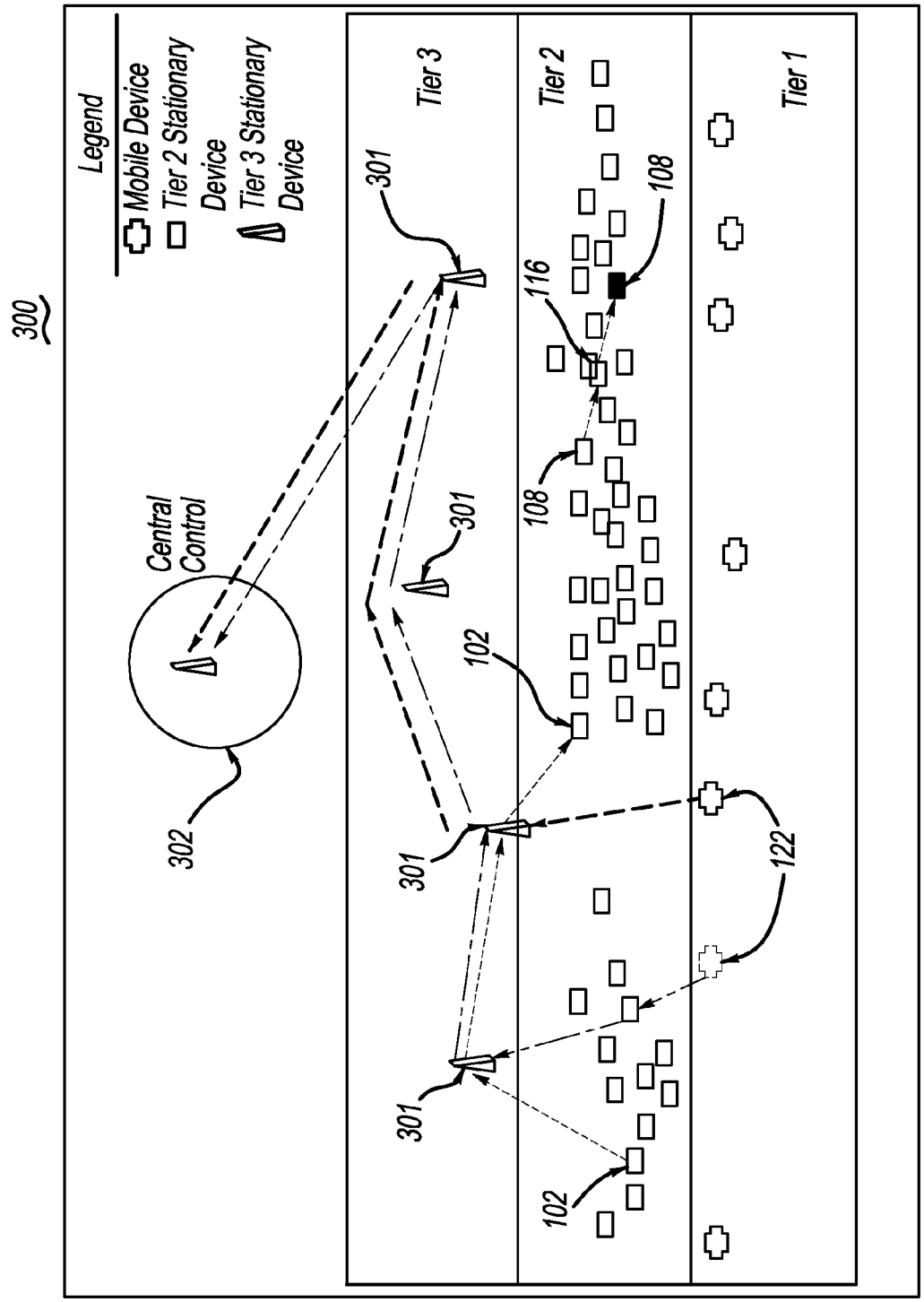
FIG. 3 is graphic depicting a multi-tier network communication architecture that may be employed in power distribution systems, such as that illustrated in FIG. 1.

FIG. 3 illustrates a multi-tiered structure for a communication network 300 that may be associated with system 100 and its associated devices. Mobile devices 122 form a first tier or Tier 1 of the network 300. A portion of the stationary devices, such as sources 102, switches 106/108, and repeaters 116 form a second tier or Tier 2 of the network 300. The remaining stationary devices 301 form a third tier or Tier 3 of the network 300. As will be described, characteristics of each of the devices determined whether the device is ultimately associated with Tier 1, Tier 2 or Tier 3. Furthermore, the dynamic nature of the communication network 300 may see devices being associated at times with one of the tiers and at other times with another tier. While the network 300 incorporates three tiers as illustrated in FIG. 3, implementations using more or fewer than three tiers are possible. An optional central control 302 may exist apart from the tiers and may be coupled to the network 300, as will also be described.

The communication network 300 may implement a protocol that can change the characteristics of the network allowing multiple applications access to the network 300. The protocol automatically accommodates the various applications such as transporting emergency messages, improving latency when required, providing a higher percentage access to the network capacity, reliably improving connectivity, providing scalability and providing spectrum utilization or reuse. Furthermore, the network 300 may operate without a central server or management system and is in essence an independent intelligent wireless ad-hoc network; however, one that implements a Transmit Power Control with Adaptive Link Routing (TPC/ALR) configuration capability.

Figure 4:
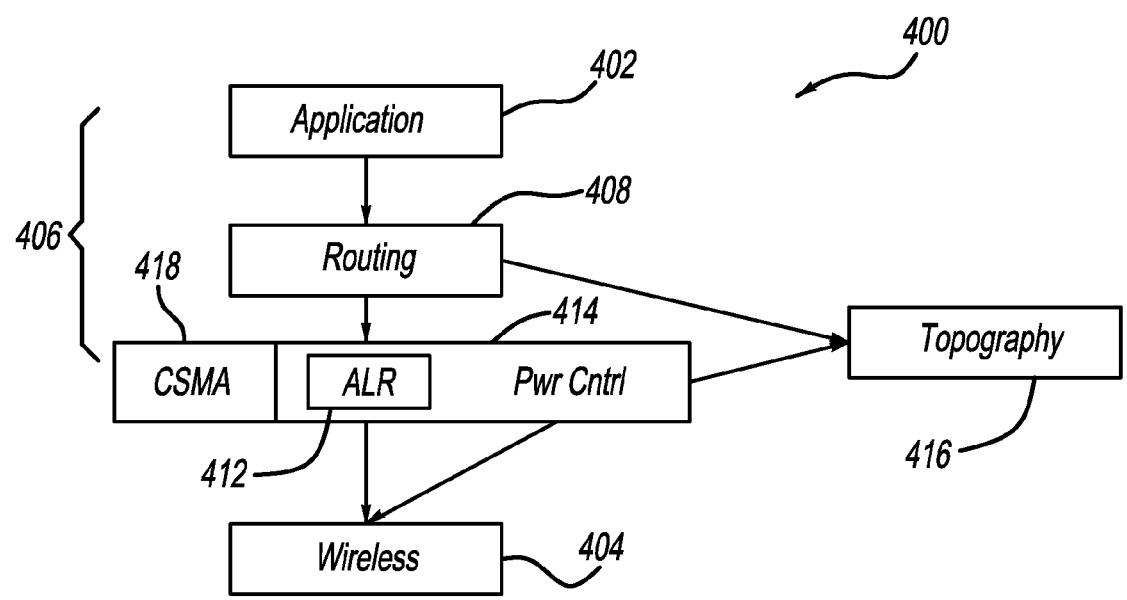
FIG. 4 is a graphic depicting a communication protocol under which the multi-tier network of FIG. 3 may be operated.

FIG. 4 illustrates the TPC/ALR protocol 400 providing link routing between an applications layer 402 and a physical, wireless communication layer 404. The transport layer 406 incorporates routing layer 408 and a access protocol 410, such as carrier sense multiple access (CSMA) operating in conjunction with adaptive routing 412 and power control 414. The TPC/ALR protocol 400 dictates the network topography 416 based on the current application using the network for transport via transmit power control and link routing based upon a three dimensional geometric (tier, compass location) relationship of a node to all other nodes within the three tiered meshed network 300.

The TPC/ALR protocol 400 may specifically provide for interlink to mobile/fixed backhaul wireless networks (not depicted). The protocol 400 is furthermore be made cognizant of the structure of the network 300, i.e., node type, node density, node location and route azimuth including calculated or provided node-to-node distance and tier elevation. The protocol 400 utilizes this information to control node transmit power, provide "smart" antenna control and radio branching, transmit unicast route request messages (RREQ), and with embedded location segment identifier information when to ignore, respond to or retransmit a RREQ. As will be described, the protocol 400 provides for routing around obstacles such as buildings, mountains, inoperable/congested nodes and dead end routes. The multi-tier network structure 300 in conjunction with the protocol 400 furthermore allows routing of data traffic in a leap-frog manner between tiers in order to meet latency and capacity loads.

The protocol 400 is operable to control the transmit power of each communication device in network 300, and in this regard is capable to control the transmit power of both RREQ and route reply (RREP) messages and corresponding data sessions. In this manner, the protocol 400 provides for extensive reuse of RF spectrum substantially increasing available bandwidth by minimizing impact of CSMA, which in systems that are not dynamic can take up to 50% of the networks capacity as well as increase latency and decrease connectivity.

Although the protocol 400 can be utilized in systems wherein the communication devices transmit primarily via omni-directional antenna, particular benefits are seen where the protocol is used in conjunction with communication devices having "smart" or directional antenna capability. Smart antenna technology is well known to the person having ordinary skill in the art. A smart antenna and communication device using a smart antenna, i.e., a node, as used herein at least means that the communication device can transmit messages in an omni mode, i.e., with a 360° radiation pattern or selectively transmit to one or more sectors or radial segments, e.g., 22°, 45°, 90°, 180°, etc. The particular technology for implementing smart antenna capability in the nodes is not critical to the operation of the protocol 400 or its benefits. Nor does the use of the term smart antenna herein imply that additional smart antenna technologies not specifically related to segment transmit capability.

In accordance with the protocol 400, as may be required, nodes may broadcast signals in all directions or transmit unicast signals within particular sectors/segments corresponding to a route/destination node direction. Smart antenna capability allows an increase in multiple routing sessions as well as an increase in spatial reuse.

The protocol 400 uses smart antennas in combination with power control to maintain a high level of connectivity and overall network communication capacity. In most instances, the protocol provides for node transmission at a lowest possible power setting (P1) consistent with latency requirements. Transmitting at a low power level increases the number of nodes involved in the route and hence increases latency. For standard transmissions, this is not of concern, and maintaining low transmit power levels helps to achieve the goal of increasing RF spectrum utilization. For certain messages, such as emergency/priority messages and other latency sensitive messages, e.g., VoIP associated messages, the protocol 400 provides for message type detection and automatic power increase (e.g., P2, P3, PX-max) thereby reducing the number of nodes for message transport. This is done in a scalable fashion with the destination node responding to a RREQ-P with its own RERR-L (routes err due to latency). The source node will then send a route request message indicating a need for reduced latency (RREQ-Pn) at a next higher power level, this RREQ-Pn will be received by a repeater node which responsive thereto will also up its power when it transmits its RREQ-Pn, and this process is repeated until the latency goal is achieved or maximum power (PX) is reached. For example, for VoIP messaging, power increase and latency reduction is established as part of the session connection process so that upon actual data transmission, i.e., dialogue, the latency goals are achieved.

Message routes are determined dynamically responsive to a RREQ and generally are not maintained. Routine message routes are dropped after a period of time of the route becoming inactive, e.g., the route may be dropped after N seconds where the value of N may be selected based upon network usage data, history data, operator selection or combinations thereof. Instead of storing routes, the protocol 400 provides that each node caches network node density and location information and neighboring nodes IP addresses and associated geographical relationship relative to its own location to facilitate route establishment using the smart antenna capability and lowest power level settings achieving latency requirements. For example, the nodes may cache IP addresses and quadrant information, e.g., geographic locations 1°-90°, 91°-180°, 181°-270° and 271°-360° compass directions relative to the node. Priority message and emergency message routes may be established using a "Fire Drill" or other similar procedure. Priority message and emergency message routes are maintained in accordance with the Fire Drill procedure.

In the described embodiments and as illustrated in FIG. 3, the network 300 is a multi-tiered mesh network consisting of Tier 1, Tier 2 and Tier 3 nodes each with their own distinct characteristics. Because Tier 1 nodes are mobile in nature they typically do not associate themselves as family with nodes in Tier 2. However in certain priority communication situations and emergency or first responder communications applications, e.g., example emergency situations, an otherwise mobile node in Tier 1 that is stationary may be automatically accepted into Tier 2 and allowed to establish its location in the mesh. This is designed into the protocol 400 to accommodate temporary nodes having to act as command posts for disaster recovery or other similar applications. Although not associated with Tier 2 nodes, Tier 1 nodes may link to Tier 2 nodes in order to affect communications, and in particular, backhaul type voice and data communications from a Tier 1 node to the central location 302.

The protocol 400 furthermore provides rudimentary handoff of a Tier 1 mobile node between multiple Tier 2 nodes. This is accomplished by automatically increasing the quantity of hello beacons corresponding to the mobile node's increase in speed. In this application while a route is being used close proximity Tier 2 nodes in essence track the Tier 1 node. This enables the Tier 1 mobile node to move between Tier 2 nodes while a route is being used. During this transition between Tier 2 nodes new and closer nodes, Tier 2 or otherwise, (stronger RF signal) become available for new routing. Data and/or voice interruption is minimized (less then 50 msec) due to the fact that the previous routing is maintained active long enough for the new route to converge with the original route.

The network 300 will generally have fewer Tier 3 nodes 301 than Tier 1 122 or 2 nodes 102/106/108/116. The Tier 3 nodes are intended to and serve primarily as a transport layer between Tier 2 clusters or to act as a backhaul for Tier 1 and Tier 2 traffic destined for the central point 302 or other destinations. Tier 3 nodes will generally have a higher above ground level (AGL) antenna centerline than the other surrounding nodes. Tier 3 nodes will furthermore re-transmit (unicast) a RREQ to a node in a destination sector, even if the Tier 3 node was not in the destination sector from the original source/repeater node.

Fixed nodes especially in high density networks will tend to cluster especially in peer-to-peer systems where each application layer based peer is constantly checking in with its peer group. Such clusters will be typical in Tier 2, and less so in Tier 1 and Tier 3, but Tier 1 or Tier 3 nodes are not prohibited from clustering. The large amount of local traffic typically generated within a cluster can hinder intra-cluster routes. In these instances should a unicast RREQ be delayed too long, the next RREQ to be generated may include a code that will be recognized by one or more Tier 3 nodes and unicast to other Tier 3 nodes that are closest to the destination nodes location thus bypassing the cluster that was delaying or blocking the RREQ. Nodes in Tier 3 can also be utilized by a source node to link to a destination node that is beyond an established node count for RREQ life expectancy or for latency requirements using only same tier nodes. Unlike Tier 2 nodes Tier 3 nodes are not constrained to route direction and may re-transmit a RREQ even if it is not in the quadrant of the proposed route. Tier 3 nodes can decide whether to re-transmit the data as a Tier 2 message or as a Tier 3 message to another Tier 3 node. Tier 2 nodes that may inadvertently receive a Tier 3 message may be configured to simply ignore the transmission, or depending on the message type and content to respond accordingly to the message.

Depending on Tier 2 node densities a Tier 3 node may have a nest of nodes tied to a sectored/directional or a single node connected to a smart antenna at one location. For multiple sectored/directional antennas configuration the protocol 400 allows interaction with RF branching networks such that the nest is able to process a RREQ and data at the link level versus going down to the IP level for retransmission.

The network 300 operating in accordance with the protocol 400 provides for each node establishing a relationship with nearby/family nodes. The relationship at least defines the geographic location of the nearby nodes relative to itself allowing unicast messaging via the use of smart antennas. The nodes are able to establish tables containing network node density information both within it's transmit power reach and beyond (overall network configuration data). Transmit power is also controlled to provide route establishment meeting latency goals, and transmit power may further define the family relationship. As described, the communication device forming each node includes a memory and processor capable of learning the family nodes, the network node density and caching this data for message transmission usage.

The following describes configuration of a network of nodes to have the structure of the network 300 and to operate in accordance with the protocol 400. For example, on initialization, a node, such as a Tier 2 node, sets its transmit power to the lowest setting and learns its physical location, either by global positioning system (GPS) or other similar positioning technology, by network operator configuration or other suitable means. The Tier 2 node then initializes a process to learn family nodes.

Figure 5:
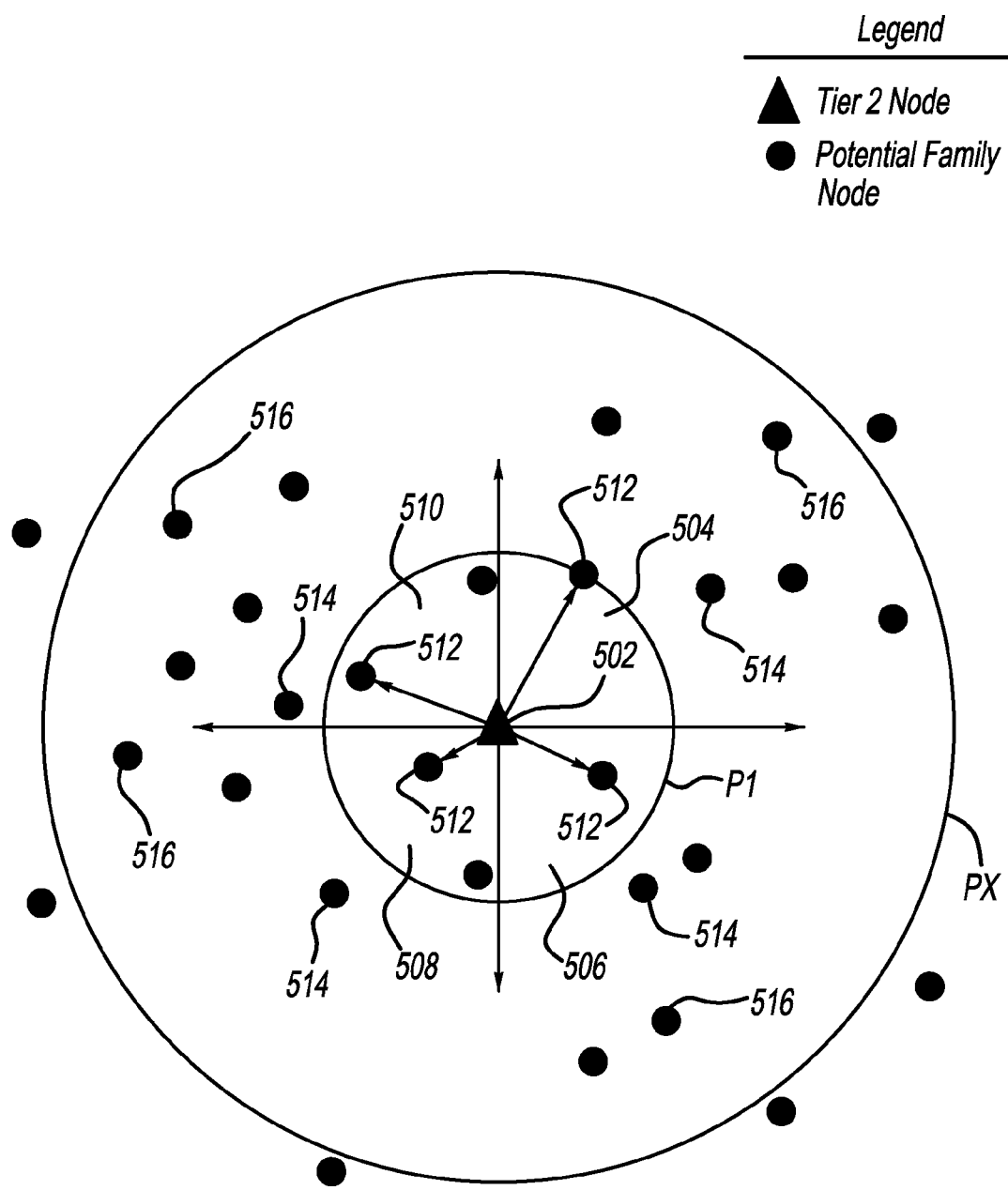
FIG. 5 is a graphic depicting establishment of node family members in accordance with the herein described protocol.

FIG. 5 illustrates a Tier 2 node 502 surrounded by a plurality of potential family nodes. The node 502 attempts to establish a link to a closest family member in each segment/sector 504, 506, 508 and 510, although more or fewer segments/sectors may be used. Family members may be defined as follows:

Sibling node: is a node that has sufficient received signal strength (RSL) to provide reliable connectivity with another node using minimum transmit (TX) power (<+10 dBm);

$1^{st}$ Cousin Node: is a node that has sufficient RSL to provide reliable connectivity with another node using medium TX power (+11 dBm to +20 dBm);

$2^{nd}$ Cousin Node: is a node that has sufficient RSL to provide reliable connectivity with another node using medium to maximum TX power (+21 dBm to +30 dBm); and DTS node: is a node that does not have sufficient RSL to provide reliable connectivity with another node using maximum TX power (>+30 dBm) and is subject to grey code blockade.

Of course, fewer or more levels of association may be defined.

Family discovery process dictates that node 502 sends an HELLO with its geographic/tier location imbedded in turn it listens for other nodes HELLO beacon that contains that nodes geographic location. Upon receipt of the Hello a node caches the nodes embedded family information. This process is repeated for various power levels (P1, P2, P3, . . . , Pn, PX), the number and power of each level potentially being user configurable, until the node 502 is able to learn and retain in its cache its sibling 512, $1^{st}$ cousin 514 and $2^{nd}$ cousin nodes 516. Nodes that do not meet these criteria are DTS, and are not retained in the cache as a family member.

Nodes controls transmit power (TX) under unicast conditions and are configured to try to obtain a substantially common RSL from all of its family members. This is accomplished in that the transmitting nodes bind their power to keep within a predetermined, e.g., N, direct links after identifying closest family members (sibling, $1^{st}$ cousins, and if necessary, $2^{nd}$ cousins). The transmitting node may exceed its bound transmit power for emergency/priority message transmission, latency sensitive messages or for various other configurable purposes. Nodes may be configured to periodically verify and update the family member table retained in its cache. In one embodiment, a node may update its family member table every n time. Thus, if nodes become inoperable, congested or otherwise unavailable, a revised family table is generated with reliable, active links.

Figure 6:
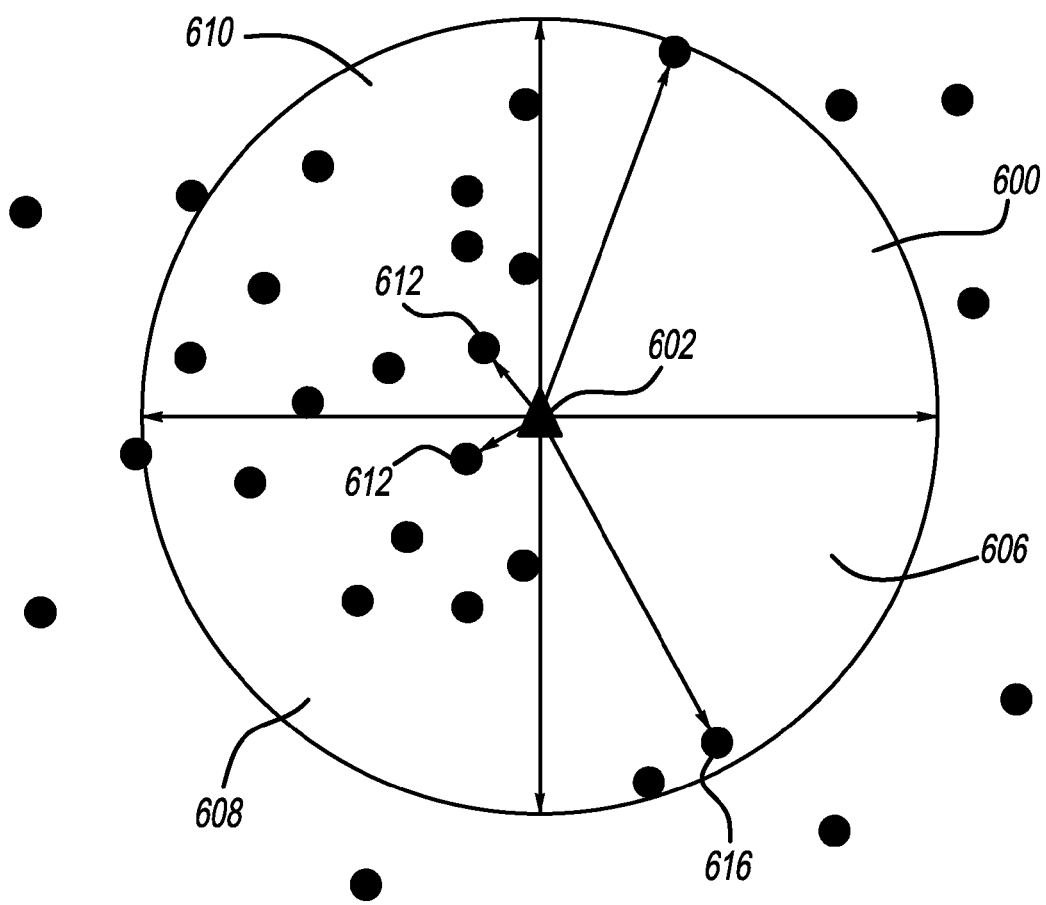
FIG. 6 is a graphic depicting establishment of node family members in accordance with the herein described protocol silent segment configuration.

Common RSL for all node family members is a goal. However, a node also attempts to meet the requirement to have a family member node in each quadrant criteria. The node 602 illustrated in FIG. 6 is only able to meet the "n_direct_links" requirement for three quadrants, 606, 608 and 610, via family members 603 with the missing quadrant 604. In this instance, the node 602 will attempt to link to family nodes in each segment up to its maximum transmit power "PX". As shown in FIG. 6, the node may link to nodes closest to the silent sectors, in this case family node 616 in the 610 quadrant. If it is unable to meet this goal, the node 602 may be adapted to assume an edge node configuration and does not pursue the location of a node in the silent sector(s). However, upon hearing a newborn node in the silent sector, the node 602 will attempt to establish a family relationship. Furthermore, whenever the node 602 receives a RREQ with imbedded geographic/tier information, the node 602 updates its cache with this information so that it is constantly updating is knowledge of the network configuration and nodes within the network structure.

The configuration, operational features and advantages of systems structured to include networks similar to the network 300 are illustrated by FIGS. 7-14 and the following discussion.

Figure 7:
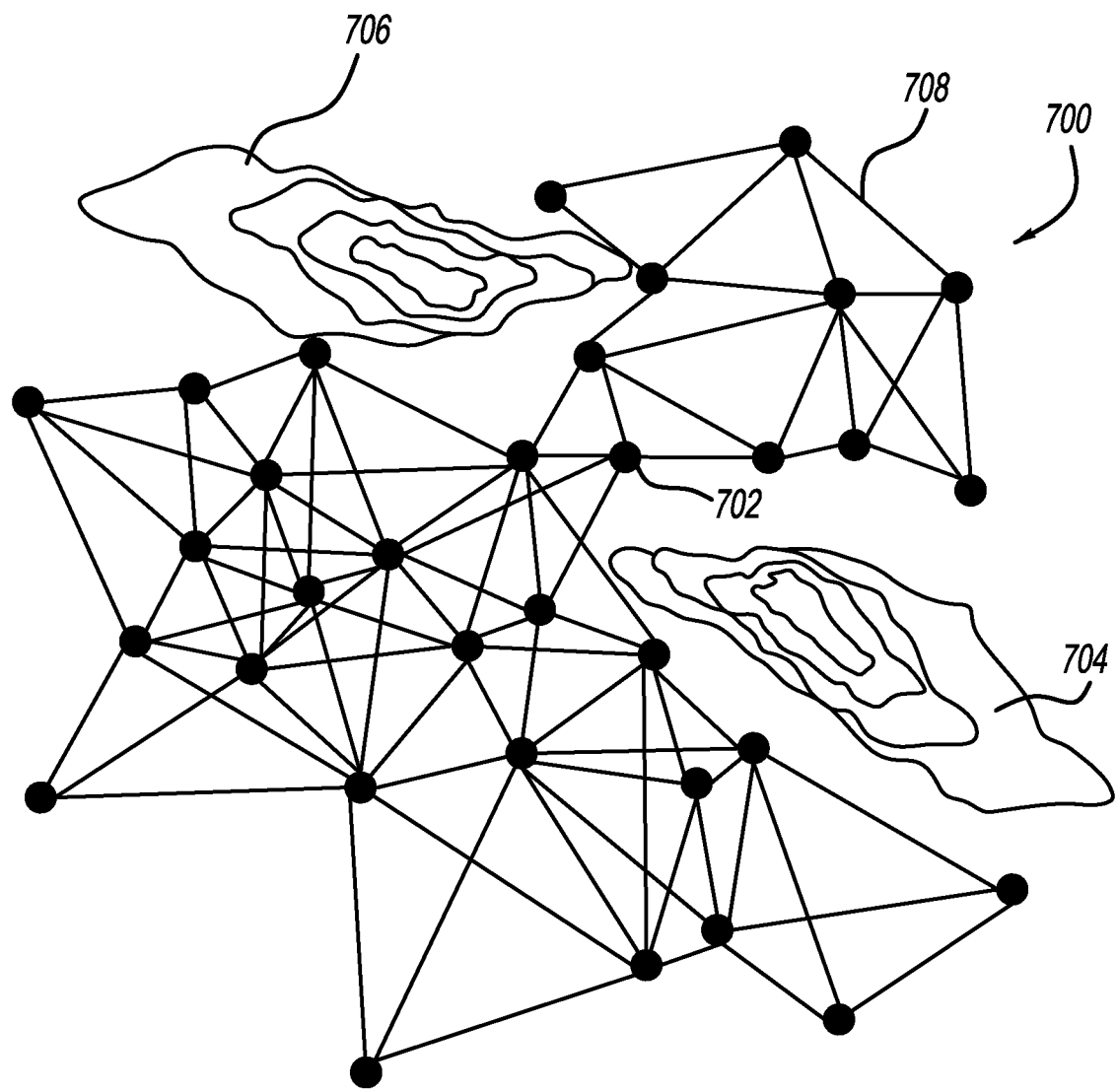
FIG. 7 is a graphic depiction of a multi-tier mesh network in accordance with the herein described embodiments.

FIG. 7 illustrates a mesh network 700 consisting of 33 Tier 2 nodes, one of which is identified as node 702, positioned around two geographic obstructions 704 and 706. Arrangement of the mesh network 700 is substantially as described in connection with the network 300 illustrated in FIG. 3. As described, each node 702 employs a discovery/mapping function allowing it to learn its physical location and the locations of its family members (sibling, $1^{st}$ cousin, $2^{nd}$ cousin, etc.) in relation to it as well as the nodes that form the mesh 708 defining the network 700.

Figure 8:
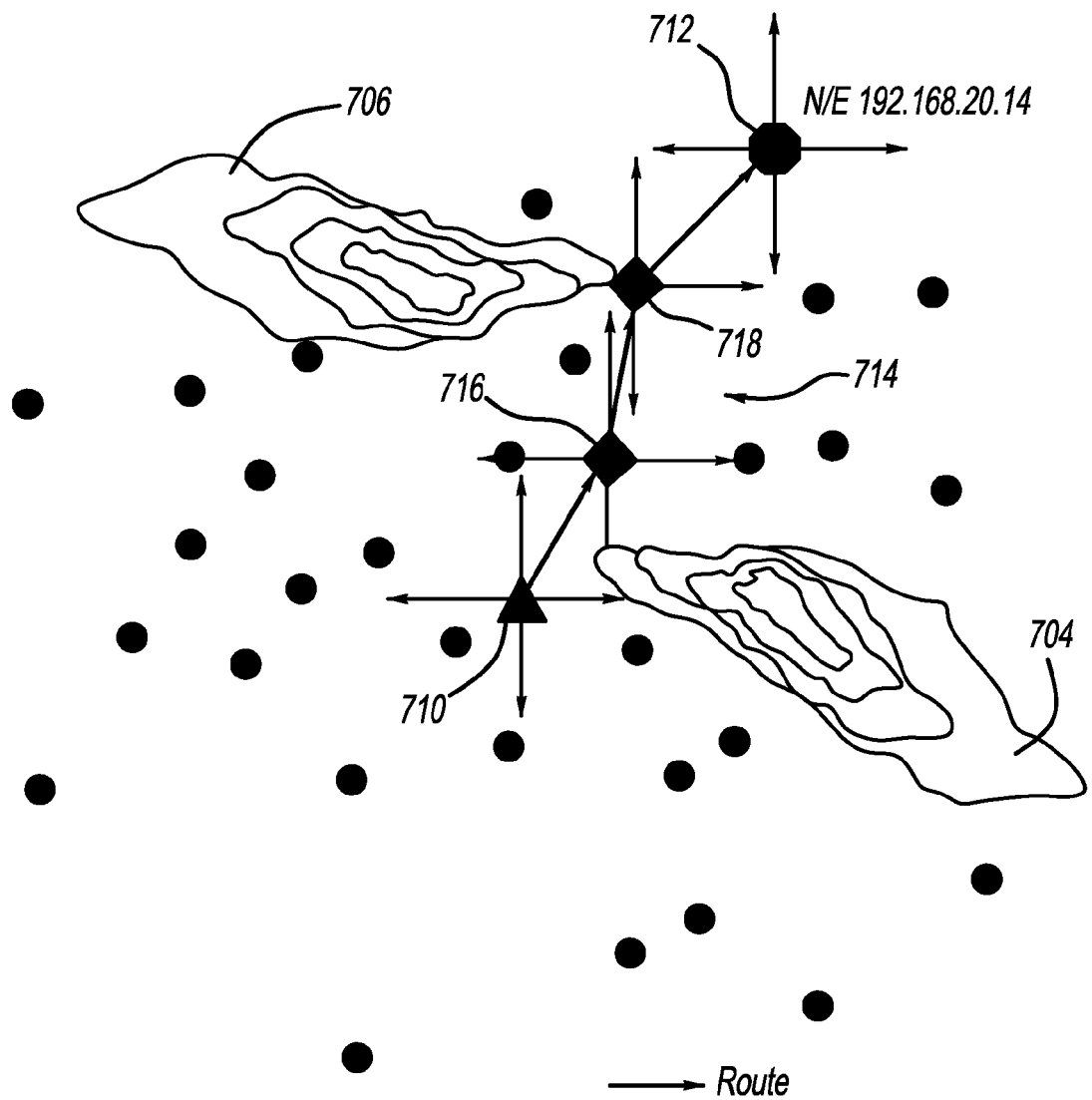
FIG. 8 is a graphic depiction of the network of FIG. 7 and further illustrating adaptive link route establishment.

In FIG. 8, the mesh representation shown in FIG. 7 is removed from the drawing to add discussion of the routing of a message from a source node 710 to a destination node 712 via a route 714. The message is assembled in accordance with virtually any suitable packet data transport protocol such as TCP/IP, UDP, or the like. The message is further adapted in accordance with the protocol 400.

To send the message, the source node 710 initiates a RREQ by first looking at its cache to determine a direction and an estimated link number to the destination node 712. The source node 708 adds the direction to the destination node address, e.g. (N/E 172.40.68.21) where the term "N/E" represents the direction, e.g., north east, of the destination node 710 relative to the source node 708 while the term "172.40.68.21" is the address identifier of the destination node 710. Various direction indicators may be used, such as the compass rose indicators: N, N/E, E, S/E, S, S/W, W, N/W; longitude/latitude indicators, or any other suitable directional indicators. The source node may furthermore add a life expectancy or latency token to the message. Because the source node 710 knows the relative direction of the destination node 712, it may utilize smart antenna capability to unicast the RREQ into a segment or segments appropriate to reach the destination node 712. A family member node of node 710, e.g., node 716, receives the RREQ; the node 716 being along the route direction relative to the bearing of the destination node 712. The node 716 similarly determines a segment or segment appropriate to reach the destination node 712 and unicasts/repeats the message into that segment reaching the node 718, which similarly unicasts/repeats the message into a segment to reach the destination node 712. At each node, the node may update the direction information contained in the message such that the directional information continues to correspond to a direction appropriate to reach the destination node.

In a RREQ implementation, nodes 719 that are not in the segments or direction of 714 may receive the RREQ. Nodes receiving a RREQ but that are not on the route 714 to the destination node 712 may be configured to ignore the message and not to repeat the message.

Figure 9:
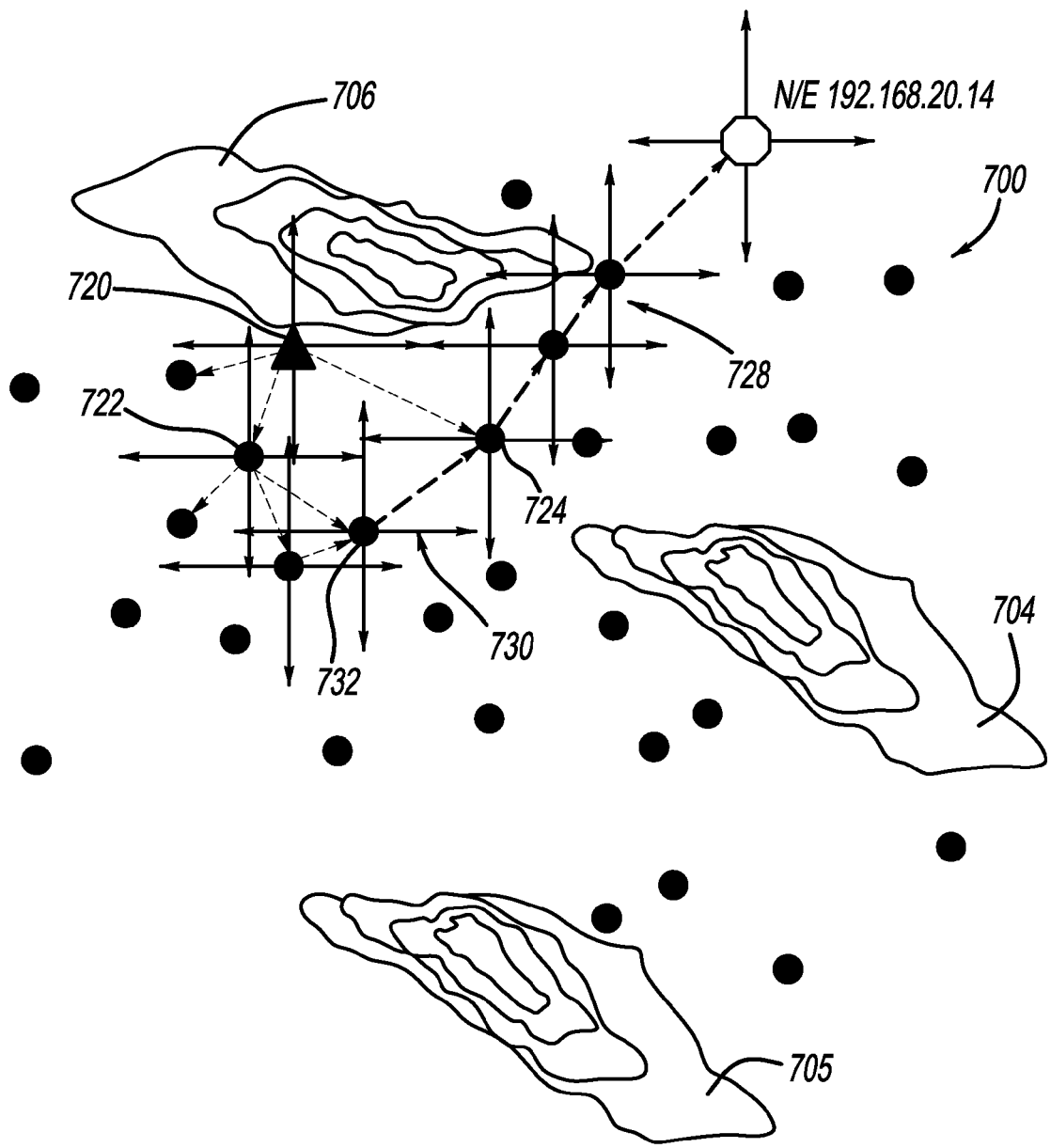
FIG. 9 is a graphic depiction of the network of FIG. 7 and further illustrating edge node affect on adaptive link route establishment.

Nodes of the network 700 furthermore may be required to use a full or limited broadcast capability as opposed to the preferred unicast technique. FIG. 9 illustrates the network 700 and a node 720 attempting to message the node 712. However the node 720 is an edge node as result of its proximity to the obstruction 706. That is, the node 720 does not have family nodes in each segment and in particular lacks a family node in the segment directed toward the destination node 712. Ordinarily family nodes to the node 720, e.g., nodes 722 and 724, not in segments supporting the route to the destination node 712 upon receiving the RREQ from the node 720 would ignore it since the node is not in a segment supporting a route to the destination. However, as a result of the discovery/mapping process, the node 720 knows that it is an edge node and furthermore knows that it does not have family members in segments supporting a route to the destination node 712. Therefore, the node 720 attaches an edge node indicator to the RREQ along with the destination node address and directional indication. Upon receipt of the RREQ including the edge node indicator, the family nodes 722 and 724 respond to the RREQ. In a first response technique, the nodes 722 or 724 service segments supporting a route to the destination node 712. Each of the nodes 722 or 724 unicast/repeat the RREQ into appropriate segments to establish routes to the destination node 712. If the nodes 722 or 724 are edge nodes or otherwise do not include segments supporting a route to the destination node 712, they may implement the multicast process further attaching an edge node indicator to the RREQ.

Figure 10:
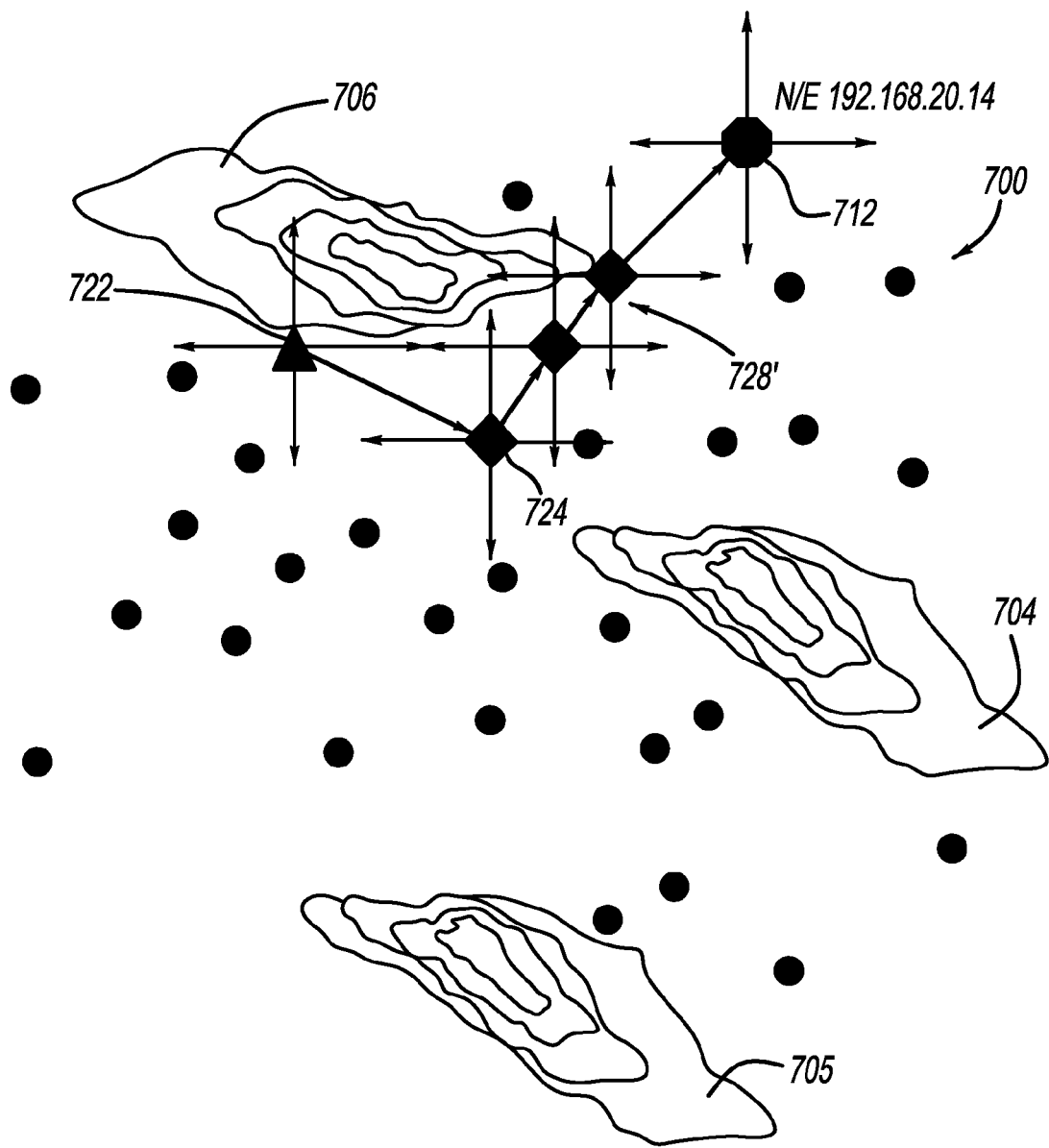
FIG. 10 is a graphic depiction of the network of FIG. 7 and further illustrating edge node route convergence.

As shown in FIG. 9, each of the nodes 722 and 724 support a segment to establish a route to the destination node 712, and thus two routes 728 and 730 are established. However, after node 732, routes 728 and 730 pass through the same nodes to reach the destination node 712. The routes 728 and 730 may be converged into a single route 728' (FIG. 10). Route convergence may be based upon a latency measures, node count indicators or other similar techniques.

Figure 11:
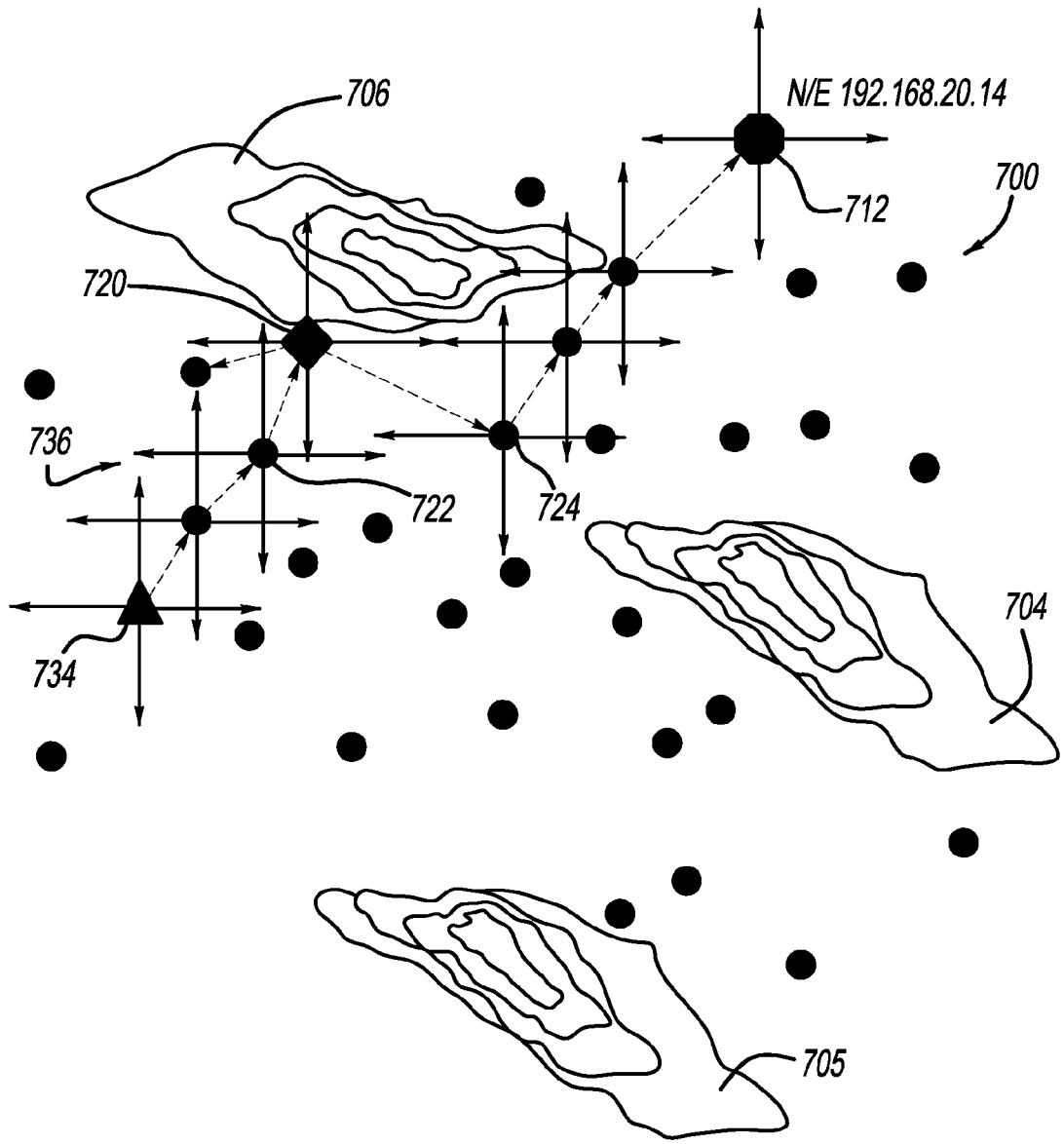
FIG. 11 is a graphic depiction of the network of FIG. 7 and further illustrating route edge node redirecting route.
Figure 12:
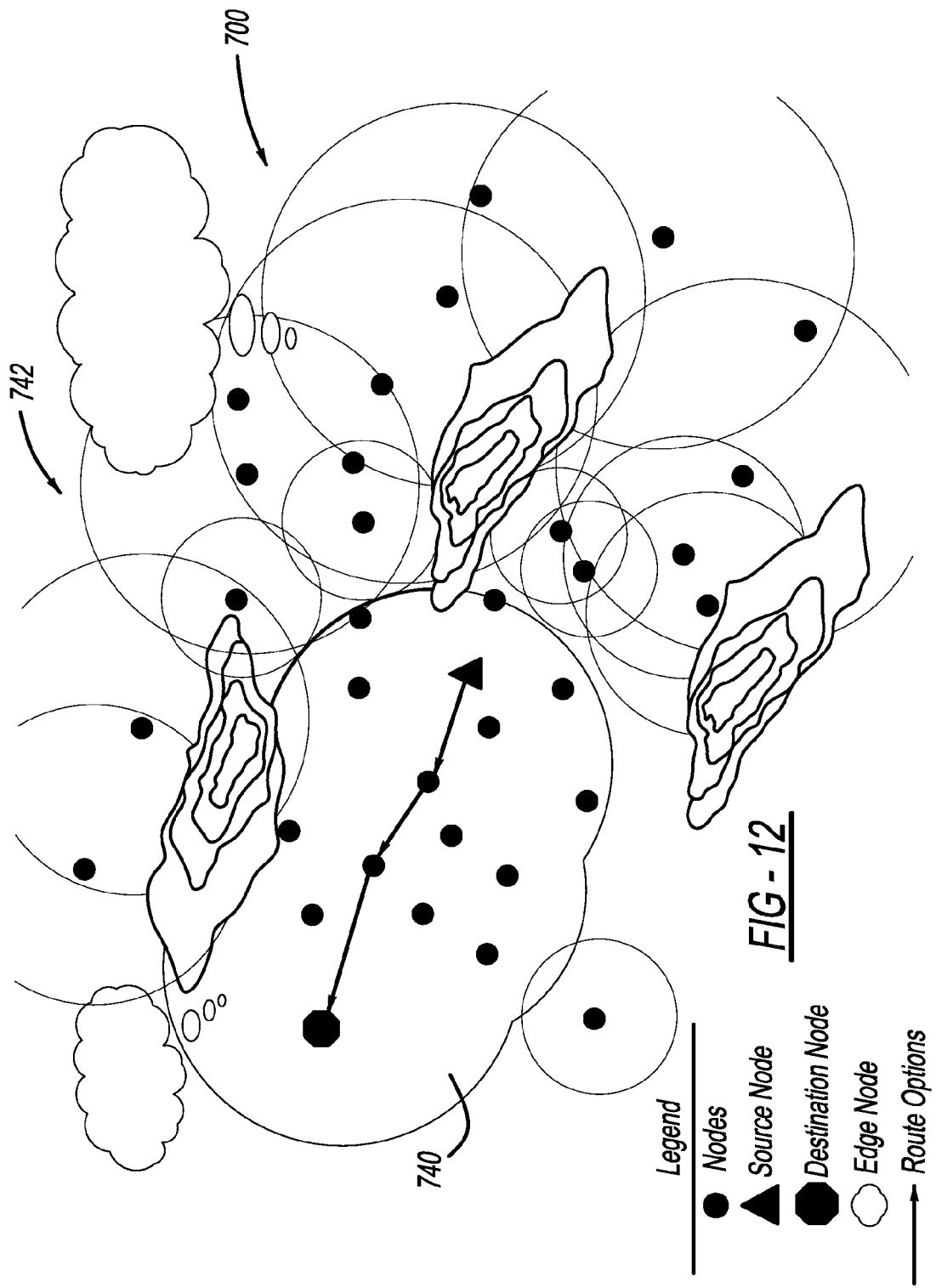
FIG. 12 is graphic depiction of the network of FIG. 7 and further illustrating priority route configuration and power binding.

The network 700 operating in accordance with the protocol 400 is operable to detect potential dead end routes or to otherwise direct messages around obstructions, such as obstructions 704, 705 and 706. A node 734 attempting to send a message to the destination node 712 initiates a RREQ, and in accordance with the protocol 400 attaches to the RREQ both the destination node address and a direction indicator. The destination node 712 is northwest of the node 734 and therefore the direction indicator is N/E. The resulting route 736 encounters the node 720, which as discussed above is an edge node and does not support a segment supporting a route directly to the destination node 712 (FIG. 11). Upon receipt of the RREQ with the N/E direction indicator along with the node 712 address, the node 720 therefore implements the foregoing described multicast technique to enlist nodes 722 and 724 to complete the route 736 to the destination node 712. As described, the route from the node 720 to the destination node 712 converges into the route 728', and hence the route 736 formed includes the route 728' from the node 720 to the destination node 712.

It may happen that upon initiating or repeating a RREQ a node will not receive a response from a family node within the latency/life expectancy requirements of the RREQ. In this instance, the node may resend the RREQ this time including an edge node indicator to enlist additional nodes to provide a response. Failing a response to the second request, the node may further resend the RREQ, this time, however, deleting the directional indicator and using a broadcast technique. A node receiving the broadcast message will attempt to implement the protocol 400 to unicast the message into an appropriate segment supporting a route to the destination node, relying on either edge node techniques or broadcast techniques when the unicast technique fails.

In accordance with the protocol 400, routes are dynamically established and are not saved beyond a predetermined period of time of route inactivity. Subsequent routes results in contemporaneous route generation. Priority/emergency messages may enjoy preferred or preestablished routes that are saved as part of a "Fire Drill" process of the network discovery/mapping process. The desire to utilize lowest unicast power settings to establish a route is retained, and the source node initiates a RREQ as previously described, unicasting the RREQ to sibling nodes but also to $1^{st}$ cousin nodes using medium unicast power. The receiving family members repeat/unicast the RREQ. If the latency requirement for the priority message is not met, the destination node replies with a RERR (L), route request error due to latency, the source node increases power and provides an indication in the RREQ for receiving family nodes to likewise increase power. Increasing unicast power has the affect of reducing the number of nodes required to support the route from the source node to the destination node, and hence reduces latency. When the destination node receives the RREQ within the required latency, the destination responds with a RREP. Moreover, these priority routes and corresponding power settings are maintained within each node cache as part of the initial network discovery/mapping.

Each node forming a priority route knows the direction of the priority route from the node (N, N/E, E, S/E, S, S/W, W, N/W). Because of potential increased power settings for priority routes, nodes in segments supporting the priority route may hear the priority message RREQ, but not being part of the priority route, e.g., due to latency issues, such nodes only listen to the RREQ and do not respond. These nodes do bind their power and instruct their family members in segments supporting the route to similarly bind their power. A node not in a segment of the priority route hearing the message will likewise bind its power. This node will also instruct its family members to similarly bind their power. The effect is to create a region 740 (FIG. 12) that is free of competing communications to the priority message. A region 742 outside the bounds of the region 740 remains available for communications, provided the transmit power is bound such that it does not interfere with and/or is subject to collision/interference requirements of the priority route. The region 742 is substantially populated by family members of nodes adjacent the priority route but not within segments supporting the priority route.

Figure 13:
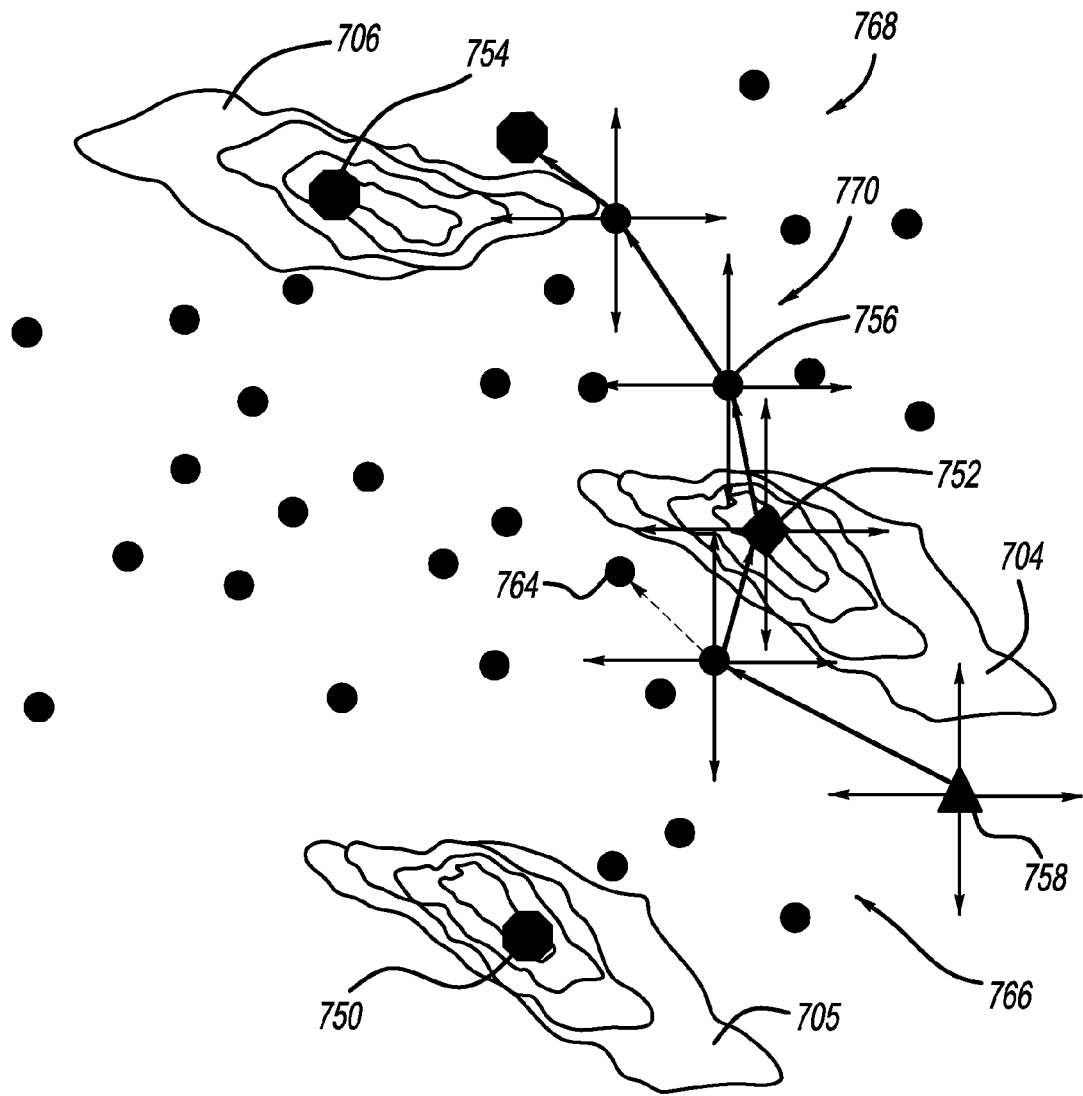
FIG. 13 is a graphic depiction of the network of FIG. 7 and further illustrating the multi-tier route configuration.

The foregoing discussion relates generally to Tier 2 node operation. Tier 3 nodes generally have a higher above ground level antenna centerline than any of the surrounding nodes, e.g., Tier 2 and Tier 1 nodes. FIG. 13 illustrates a network 700'. The network 700' is substantially the mesh network 700 described above further including the Tier 3 nodes 750, 752 and 754. Positioned substantially above the Tier 2 and Tier 1 nodes, e.g., on the obstructions 704, 705 and 706, the Tier 3 nodes 750, 752 and 754 see nodes that the Tier 2 or Tier 1 nodes cannot see. Upon receiving a RREQ, a Tier 3 node, e.g., node 752 will unicast the RREQ to a family member 756 in the destination segment even if the Tier 3 node is not in the destination segment of the original source node 758. This allows establishment of a route 770 over the obstruction 704 as opposed to around it using Tier 2 and Tier 1 nodes, e.g., 764, reducing latency. This arrangement furthermore supports cluster-to-cluster communication from a first cluster 766 of Tier 2 nodes to a second cluster 768 of Tier 2 nodes.

Figure 14:
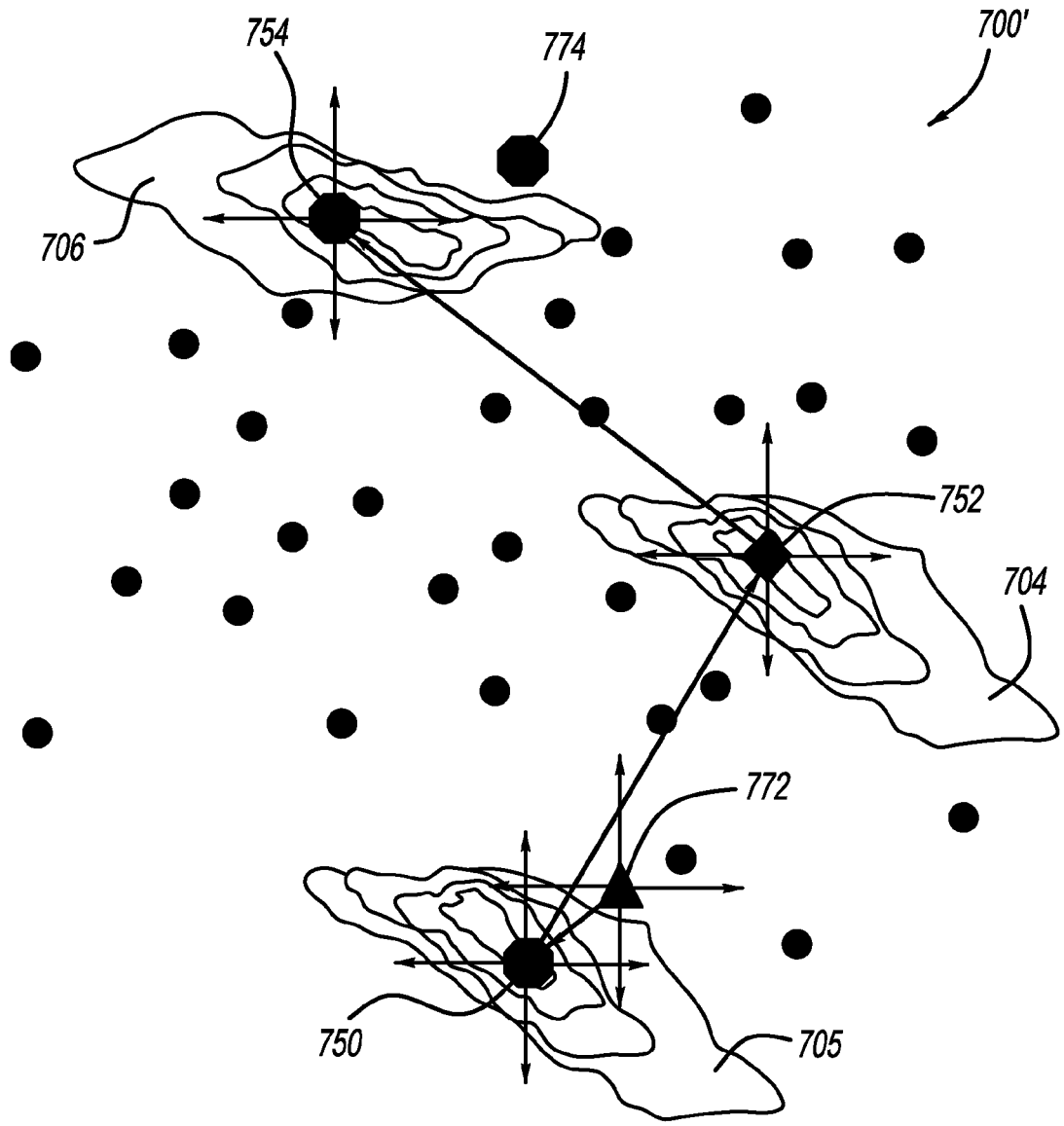
FIG. 14 is a graphic depiction of the network of FIG. 7 and further illustrating the multi-tier routing configuration.

The Tier 3 nodes 750, 752 and 754 furthermore support backhaul communication, communicate to a central point and reduced latency by reducing the number of route forming nodes. Referring to FIG. 14, a RREQ to a destination node 774 initiated a Tier 2 node 772 is received by Tier 3 node 750. The node 750 unicasts the RREQ to Tier 3 node 752, which in turn, unicasts the RREQ to Tier 3 node 754. The node 754 unicasts the RREQ to the destination node 774. Upon unicast between nodes 750 and 752 and between nodes 752 and 754, the nodes 756 and 754 attach a Tier 3 node identifier to the RREQ, signifying to Tier 2 and Tier 1 nodes that listen and can hear the RREQ not to respond to the RREQ.

Figure 15:
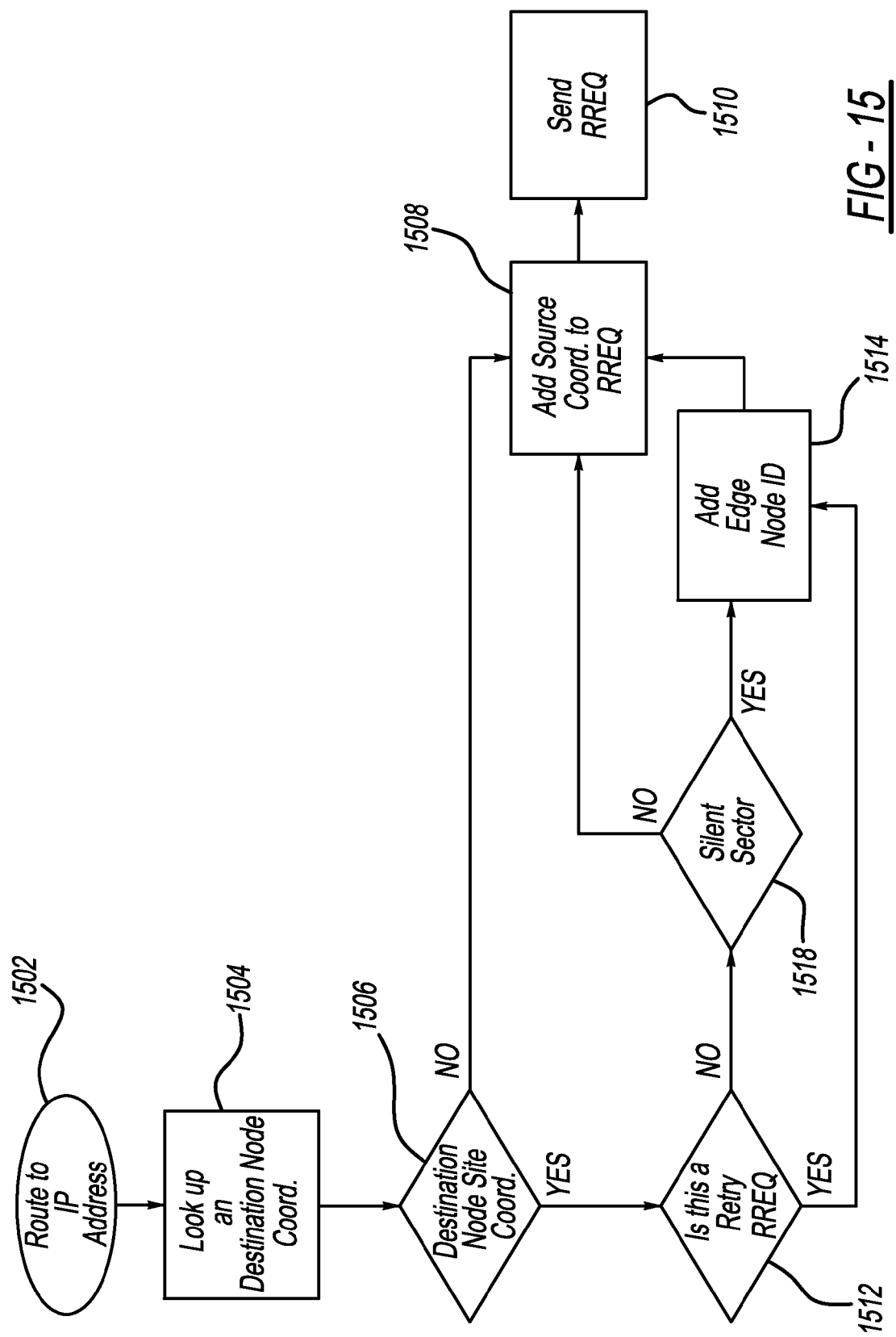
FIGS. 15-19 are flow charts depicting node operation in accordance with embodiments of the herein described protocol.

The flowcharts of FIGS. 15-19 depict the operation of the nodes in a multi-tier mesh network structure according to an operating protocol, such as the network and operating protocol described above. FIG. 15 depicts source node RREQ initiation. At 1502 the address of the destination node is identified, and at 1504, the source node looks into its cache to determine the location indicator to be attached to the destination node address in the RREQ. If the destination nodes location indicator is not contained in the cache, 1506, the source node attaches its coordinates 1508 and the RREQ is sent, 1510. If the destination location indicator is contained in the cache, the source node checks whether this is a retry to send the RREQ, 1512. A RREQ retry is an indication that a family node did not respond to the original RREQ. To expand the number of family nodes hearing the RREQ that may respond, an edge node identifier may be attached to the RREQ, 1514, allowing multicast of the RREQ and broader response. Such is also the case it if determined that the destination segment is a silent sector, 1518.

Figure 16:
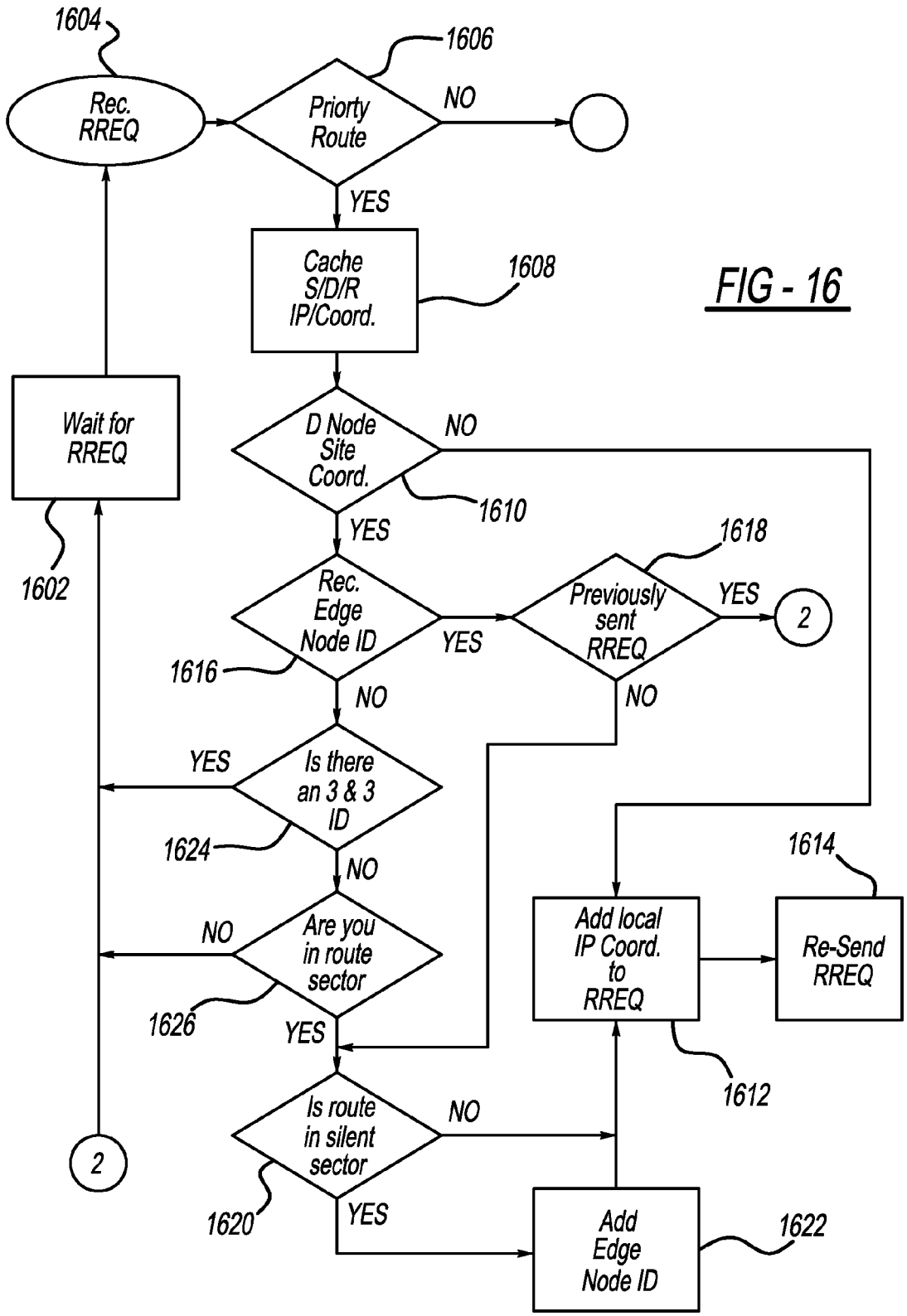

The response of a node receiving the RREQ is depicted in the flowchart of FIG. 16. The node waits, 1602, to receive a RREQ. Upon receipt of a RREQ, 1604, the node determines first if the route is a priority route, 1606, which is handled in accordance with the flowchart of FIG. 19. If it is not a priority route the receiving node caches the route source/destination node address and coordinates, 1608. Next, the node checks the destination node location indicator, 1610, and if not present, which may result is the source node has not included the destination location indicator because of a failed RREQ, the local node address and location indicator is added to the RREQ, 1612, and the RREQ is resent, 1614. Otherwise, the received RREQ is checked for an edge node indicator, 1616. If an edge node indicator is present, and the RREQ was previously sent, the node returns to waiting to receive a RREQ, 1618. Otherwise, the node checks if the route is in a silent segment, 1620. If the route is not to a silent sector the local node address and location indicator is added, 1612, and the RREQ is resent, 1614. Otherwise, an edge node indicator is added, 1622, before adding the local node address and location and resending the RREQ. Lacking an edge node indicator, the node checks the RREQ to determine if it is a Tier 3 RREQ, 1624, and if so, the node returns to waiting to receive an RREQ, 1602. If the RREQ is not a Tier 3 RREQ and the node is in a segment supporting the route, 1626, the silent sector check is performed, 1620, before adding an edge node indicator, 1622, if appropriate, and the local node address and location indicator 1612 before resending the RREQ 1614.

Figure 17:
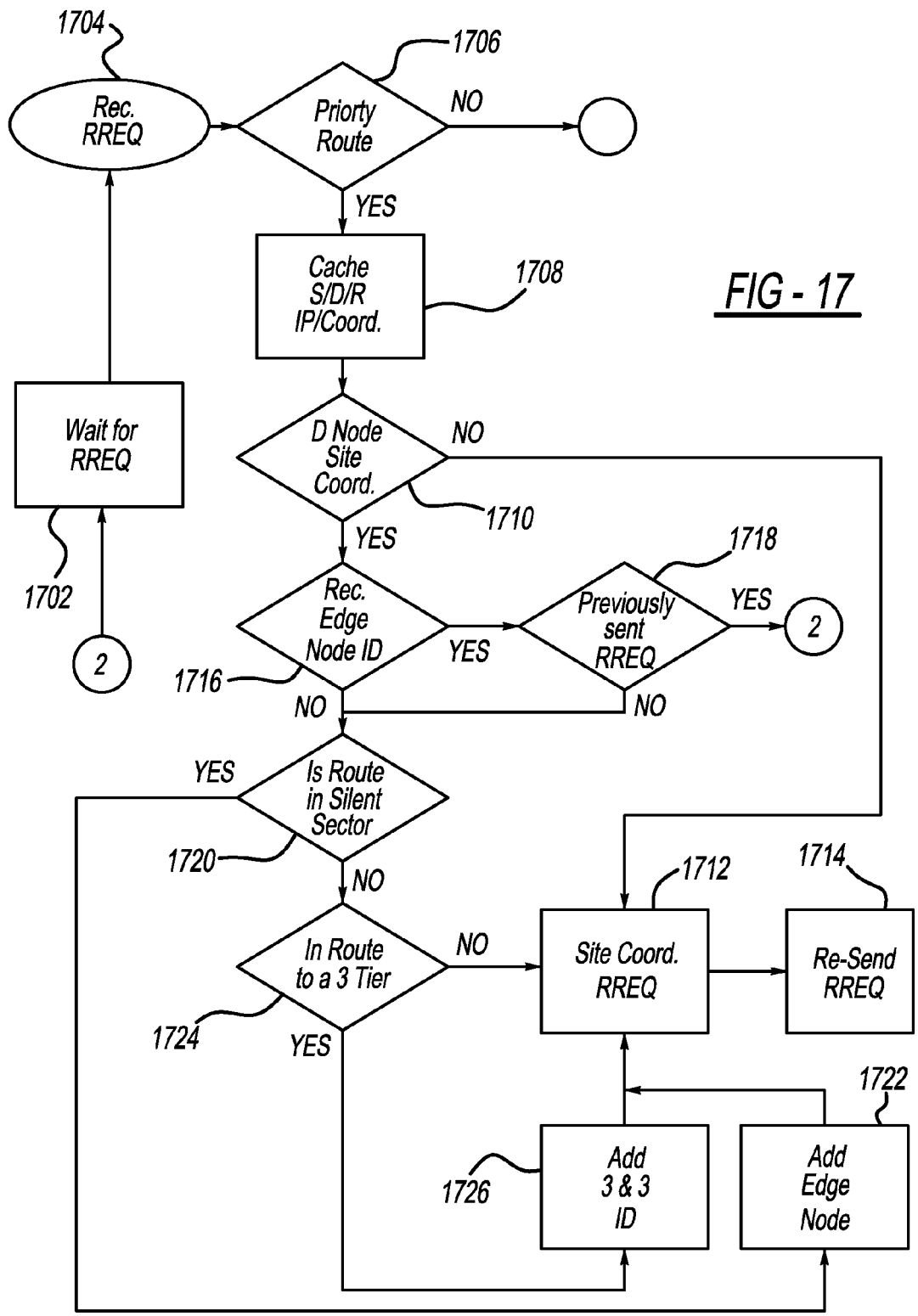

FIG. 17 illustrates in flowchart form similar response to receipt of a RREQ by a Tier 3 node. The node waits, 1702, to receive a RREQ. Upon receipt of a RREQ, 1704, the node determines first if the route is a priority route, 1706. If it is not a priority route the receiving node caches the route source/destination node address and coordinates, 1708. Next, the node checks whether destination node location indicator, 1710, and if not present, the node location indicator is added to the RREQ, 1712, and the RREQ is resent, 1714. Otherwise, the received RREQ is checked for an edge node indicator, 1716. If an edge node indicator is present, and the RREQ was previously sent, 1718, the node returns to waiting to receive a RREQ, 1702. Otherwise, the node checks if the route is in a silent segment, 1720. If the route is in a silent segment, an edge node indicator is added, 1722, the node location is added to the RREQ, 1712, and the RREQ is resent, 1714. Otherwise, the node checks the RREQ to determine if it is a Tier 3 RREQ, 1724, and if so, the node adds the Tier 3 indicator, 1726, the node location is added to the RREQ, 1712, and the RREQ is resent, 1714.

Figure 18:
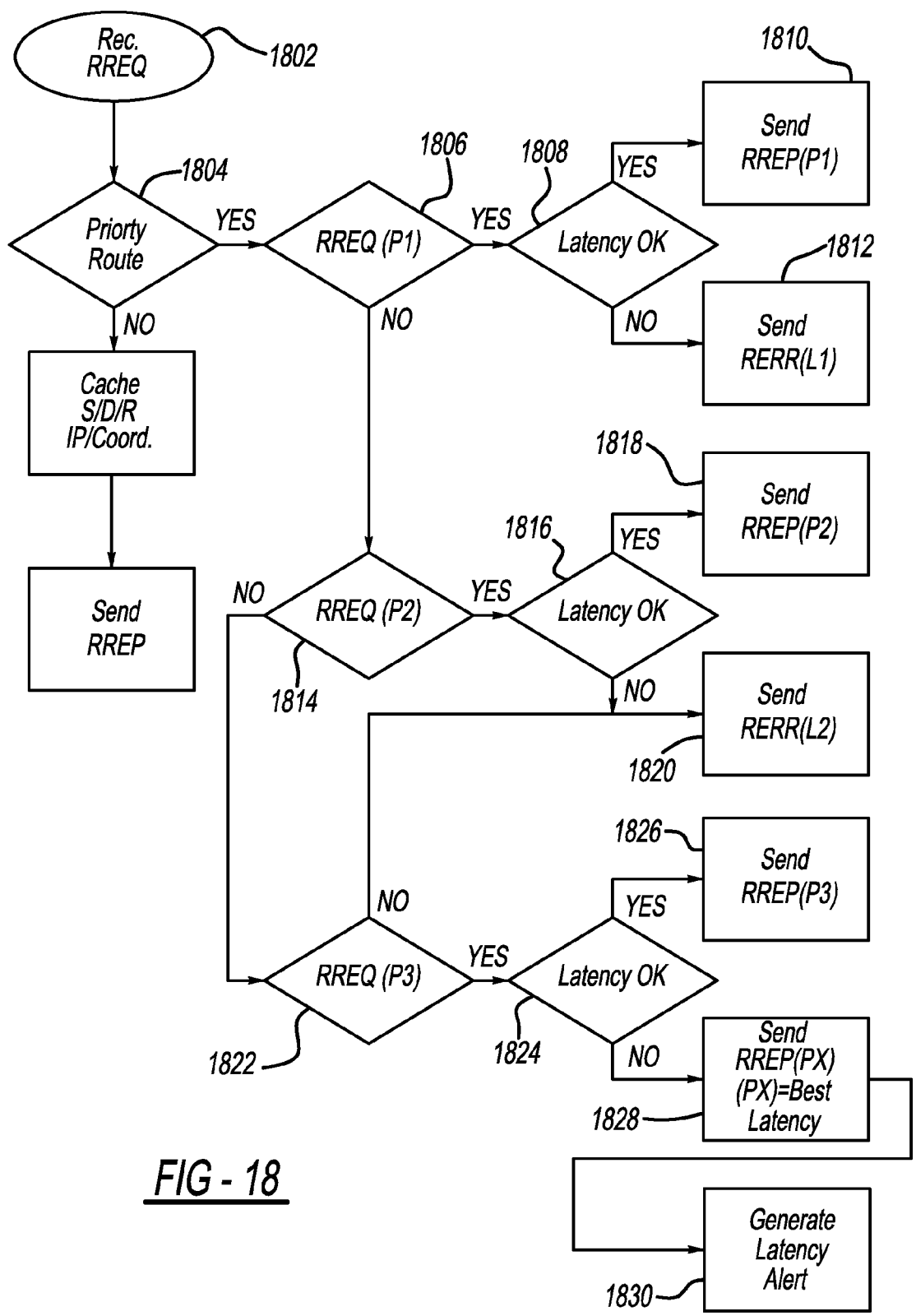

FIG. 18 illustrates priority route processing after a determination that the RREQ refers to a priority route, as depicted in FIGS. 16 and 17. Upon receipt of a RREQ, 1802, and confirmation that it is associated with a priority route, 1804, the node checks the RREQ power level, 1806. If it the power level is lowest (P1), the latency is checked, 1808, and a RREP-P1 or a RERR-L1, 1810 and 1812, respectively, is sent. If the power level is a medium power level (P2, P3, . . . Pn), 1814, the latency is checked, 1816, and a RREP-Pn or a RERR-Ln, 1818 and 1820, respectively, is sent. If the power level is maximum power level (PX), 1822, the latency is checked, 1824, and a RREP-PX is sent if latency is ok, 1826. If latency is not ok, best latency reply, RREP (PX) is sent, 1828 and a latency alert is generated, 1830.

Figure 19:
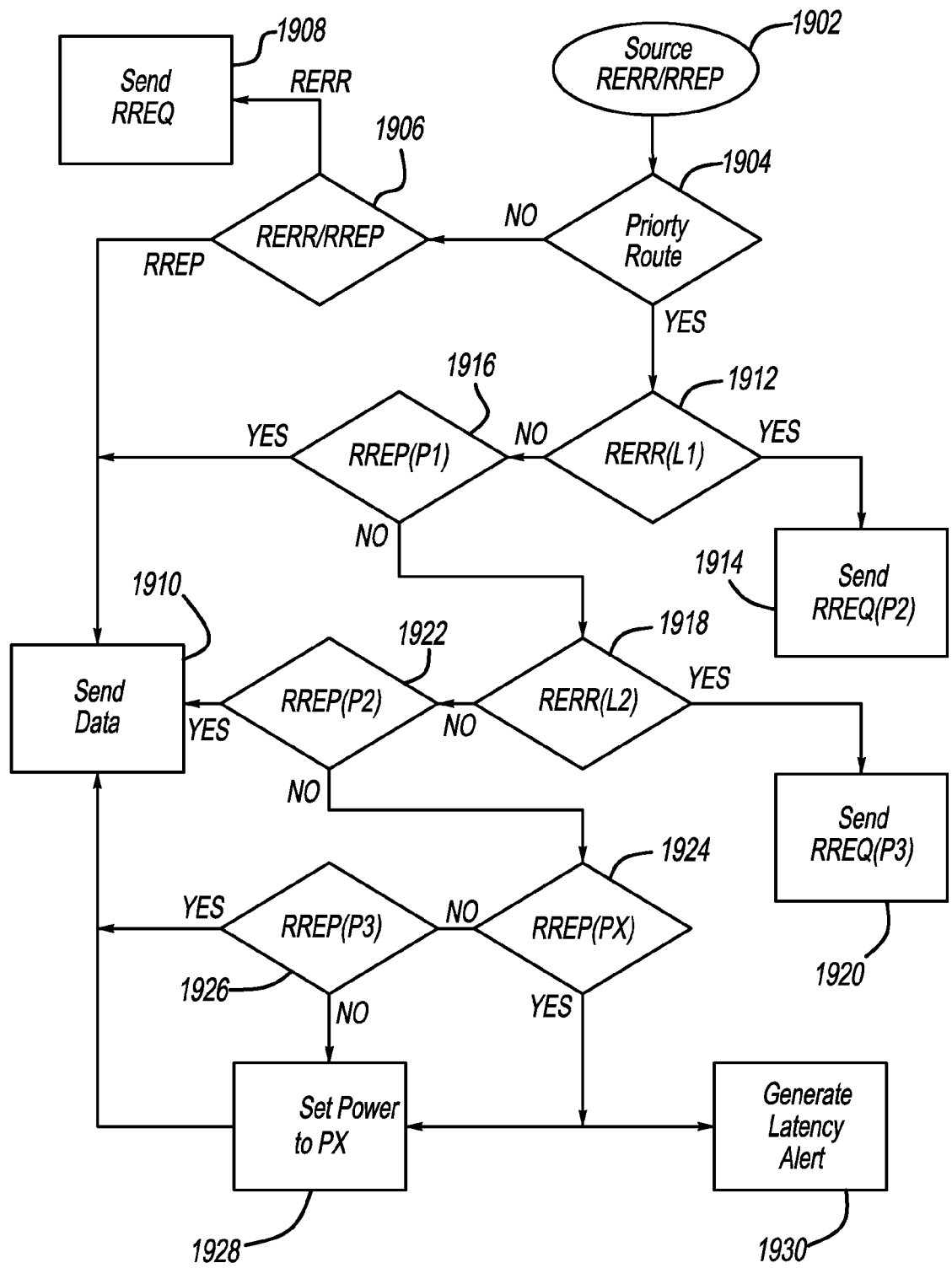

The action of the source node to the RREP/RERR messages is depicted in FIG. 19. Upon receiving either an RREP or RERR, 1902, the priority status of the route is checked, 1904, and if it is not a priority route, for the RERR message, 1906, the RREQ is resent, 1908. Otherwise, the data is sent via the route, 1910. Confirming the priority status of the route, RERR(L1)/RREP(P1) messages are checked, 1912. If there is a latency error, the RREQ is sent at the next power level, 1914. If there is no latency error at the power level P1, and there is a route reply (RREP(P1)), 1916, the data is sent, 1910. If there is neither a RREP(P1) or RERR(L1), RERR(L2)/RREP(P2) messages are checked, 1918. If there is a latency error, the RREQ is sent at the next power level, 1920. If there is no latency error at a medium power level (P2, P3, . . . , Pn), and there is a route reply at medium power level (RREP(Pn)), 1922, the data is sent, 1910. If there is neither a RREP(P2) or RERR(L2), RREP(P3)/RREP(PX) messages are checked, 1924. If there is a RREP(PX) message, 1926, the transmit power level is set to max (PX), 1928, the data is sent, 1910 and a latency alert is generated, 1930. Otherwise, based upon the RREP(Pn), the data is sent, 1910.

A multi-tier mesh network and an operating protocol as herein described will find numerous applications. In the primary embodiment described herein, the network and protocol find application in a power distribution system having distributed source, switching/control and load elements with communication capability. New technology in this field requires a communication capability to recognize and transport priority messages and decrease latency. This is necessary to allow peer-to-peer switching devices to react quickly enough to detect, protect and restore the power grid that may cover 5 to 10 square miles of infrastructure. Multiple nodes must detect, react and transport high priority messages in mille-seconds to prevent circuit overloads and protect expensive utility infrastructure. At the same time nodes not directly involved in the emergency session need to quickly bind their power to minimize interference for the priority messages to be transported.

Another application of the herein described network structure and protocol is in commodity processing and/or distribution systems such as petroleum processing and distribution systems. Similar to power distribution systems, petroleum processing and distribution requires a system that can automatically/remotely detect and isolate faulty valves, broken pipes and vandalism/terrorist attacks. In this application the $2^{nd}$ Tier nodes generally have the mission critical responsibility and are the core infrastructure relative to the $1^{st}$ and $3^{rd}$ Tier nodes. Infrastructure protection is the primary mission of the $2^{nd}$ tier mesh in this applications as the need for emergency communications is required less then 5% of the time for a given grid section. Thus, the communication network and protocol may be used for SCADA, telemetry, meter reading, video surveillance, vehicle and voice for the majority of the time. The herein described network and protocol can quickly change applications automatically from routine communications to emergency communications and in a timely manner. The network and protocol according to the herein described embodiments is further adept at providing for the $2^{nd}$ tier nodes to accommodate and route $1^{st}$ tier voice and data from mobile units to the $3^{rd}$ tier nodes for backhaul without loosing sight of its original mission to protect the infrastructure.

Yet another application relates primarily to emergency/local communication/first responder services. The herein described networks and protocol are well suited for providing a reliable network for emergency communications because of the capability to react to priority messages, vehicle/node location and video surveillance. The networks and protocol furthermore allow for a migration path to convergent technology. In this application the $1^{st}$ tier nodes have the mission critical responsibility and forms the core of the infrastructure relative to the $2^{nd}$ and $3^{rd}$ tier nodes. In this case the $2^{nd}$ tier fixed nodes are predominantly utilized as repeaters (occasionally video surveillance nodes) between $1^{st}$ and $3^{rd}$ tier node backhaul and provide an RF footprint to the geographical area (similar to cell sites) for $1^{st}$ tier node connectivity. Priority messages are generated by the $1^{st}$ tier mobile nodes and transported via $2^{nd}$ and $3^{rd}$ tiers nodes to central command/dispatch.

While the invention is described in terms of several preferred embodiments of power distribution protection and recovery systems and corresponding methods, it will be appreciated that the invention is not limited to such systems and methods. The inventive concepts may be employed in connection with any number of systems, devices and methods for providing coordinated distribution system protection.

While the present disclosure is susceptible to various modifications and alternative forms, certain embodiments are shown by way of example in the drawings and the herein described embodiments. It will be understood, however, that this disclosure is not intended to limit the invention to the particular forms described, but to the contrary, the invention is intended to cover all modifications, alternatives, and equivalents defined by the appended claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning Unless a claim element is defined by reciting the word "means" and a function without the recital of any structure, it is not intended that the scope of any claim element be interpreted based on the application of 35 U.S.C. §112, sixth paragraph.

I claim:

1. In a commodity processing and/or power distribution system having distributed network components, hereinafter nodes, each node having communication capability, a method for affecting message communication between the nodes, the method comprising:

grouping a plurality less than all of the nodes into a first tier of a communication network and grouping the remaining nodes into at least a second tier of the communication network;

determining, relative to each node, intra-tier family nodes, wherein designation for each family node includes an address and a location indicator, and wherein each family node is so designated based on at least one of the criteria;

a node that has sufficient received signal strength to provide reliable connectivity with another node using minimum transmit power;

a node that has sufficient received signal strength to provide reliable connectivity with another node using medium transmit power; and a node that has sufficient received signal strength to provide reliable connectivity with another node using medium to maximum transmit power;

initiating a route request from a second tier source node to a first tier or second tier destination node, the route request including the address of the destination node and the location indicator for the destination node; and unicasting the route request (RREQ) to a family node of the source node based upon the location indicator to establish an inter or intra-tier route, wherein the route request including a latency requirement indication, and wherein the destination node is responsive to receipt of the route request (RREQ) and the latency requirement indication to provide a route reply message (RREP) or a route error message (RERR), the source node being responsive to the route reply message (RREP) to begin data communication and further being responsive to the route error message (RERR) to resend the route request.

2. The method of claim 1, wherein each node is associated with one of the first tier or the second tier based upon at least one characteristic of the node.

3. The method of claim 2, wherein the characteristic comprises: mobility, physical relationship or node function.

4. The method of claim 1, wherein physical relationship comprises relative elevation of the node with respect to the remaining nodes.

5. The method of claim 1, wherein one or more of the nodes is designated as an edge node based upon not having family nodes in each of a set of segments extending about the node.

6. The method of claim 5, wherein the edge node is configured to either unicast or broadcast the route request (RREQ) responsive to the existence and location of family nodes associated with the edge node.

7. The method of claim 1, wherein a node disassociated from the route bearing location indicator is configured to not respond to the route request (RREQ).

8. The method of claim 1, the source node being operable to broadcast the route request (RREQ) responsive to a failure to receive a route reply to the unicast of the route request.

9. The method of claim 1, wherein the family nodes are further designated based upon a power level value required for the node to communicate with the family node.

10. The method of claim 1, wherein the nodes are physically dispersed over a geographic area in three dimensions, and wherein each node is associated with one of the first tier and the second tier based upon the characteristics of the physical location of the node.

11. The method of claim 10, the second tier nodes having a higher physical elevation with respect to the first tier nodes.

12. The method of claim 10, the second tier nodes are configured to respond to a route request (RREQ) regardless of its locational relationship to the destination node.

13. The method of claim 10, the second tier nodes configured to attach a second tier node indicator to the route request (RREQ) to provide a revised route request, the second tier nodes are configured to respond to the revised route request (RREQ) while first tier nodes are configured to ignore the revised route request.

14. The method of claim 1, wherein the route request (RREQ) is related to a priority message and a priority route, the priority route being defined by a set of the nodes.

15. The method of claim 14, wherein family nodes of the set of the nodes defining the priority route have bound power during communication of the priority message.

16. The method of claim 1, wherein the source node is responsive to the route error message (RERR) to resend the route request message at an increased power level.

17. The method of claim 1, wherein the source node is responsive to the route error message (RERR) to resend the route request message (RREQ) as a broadcast route request (RREQ).

18. The method of claim 1, comprising, responsive to the route request (RREQ), a route between the source node and the destination node, the route including an intermediary node, the intermediary node being associated with the location indicator.

19. The method of claim 18, comprising, responsive to the route request (RREQ), two routes between the source node and the destination node.

20. The method of claim 1, wherein the commodity processing and/or distribution system comprises a power distribution system having distributed source, switching and load components corresponding to the nodes.

\* \* \* \* \*